(12) United States Patent
Boduch et al.

(10) Patent No.: US 9,008,514 B2
(45) Date of Patent: Apr. 14, 2015

(54) METHOD AND APPARATUS FOR CONSTRUCTION OF COMPACT OPTICAL NODES USING WAVELENGTH EQUALIZING ARRAYS

(71) Applicants: Mark E. Boduch, Geneva, IL (US); Kimon Papakos, Evanston, IL (US)

(72) Inventors: Mark E. Boduch, Geneva, IL (US); Kimon Papakos, Evanston, IL (US)

( * ) Notice: Subject to any disclaimer, the term of this patent is extended or adjusted under 35 U.S.C. 154(b) by 33 days.

(21) Appl. No.: 13/924,542

(22) Filed: Jun. 22, 2013

(65) Prior Publication Data

US 2014/0376918 A1    Dec. 25, 2014

(51) Int. Cl.
*H04J 14/02*    (2006.01)

(52) U.S. Cl.
CPC ................... *H04J 14/021* (2013.01)

(58) Field of Classification Search
CPC ... H04J 14/02; H04J 14/0202; H04J 14/0204; H04J 14/0205; H04J 14/021; H04J 14/0212; H04J 14/0217; H04J 14/0221
USPC .......... 398/83, 79, 82, 84, 85, 87, 45, 48, 49, 398/158, 159, 160, 33, 34, 38, 58, 59; 385/24, 37, 16, 17, 18
See application file for complete search history.

(56) References Cited

U.S. PATENT DOCUMENTS

| | | | |
|---|---|---|---|
| 7,630,634 B1 | 12/2009 | Boduch | |
| 7,916,502 B2 | 3/2011 | Papakos et al. | |
| 8,116,629 B2 | 2/2012 | Boduch et al. | |
| 8,126,330 B2 * | 2/2012 | Wisseman | 398/83 |
| 8,165,468 B2 | 4/2012 | Boduch et al. | |
| 8,190,027 B2 | 5/2012 | Boduch et al. | |
| 8,320,759 B2 | 11/2012 | Boduch | |
| 8,328,026 B2 | 12/2012 | Boduch et al. | |
| 8,401,348 B2 | 3/2013 | Boduch | |
| 8,428,461 B2 | 4/2013 | Boduch et al. | |
| 8,447,183 B2 | 5/2013 | Boduch et al. | |
| 2003/0025956 A1 * | 2/2003 | Li et al. | 359/110 |
| 2011/0132855 A1 | 6/2011 | Papakos et al. | |
| 2011/0262135 A1 | 10/2011 | Boduch et al. | |
| 2012/0106970 A1 | 5/2012 | Boduch et al. | |
| 2012/0293934 A1 | 11/2012 | Boduch et al. | |
| 2012/0293969 A1 | 11/2012 | Papakos et al. | |
| 2013/0051726 A1 | 2/2013 | Wagener et al. | |
| 2013/0142516 A1 * | 6/2013 | Zhou | 398/83 |

OTHER PUBLICATIONS

Yasuki Sakurai et al., LCOS-based Grid less Wavelength Blocker Array for Broadband Signals at 100Gbps and Beyond. Published in: Optical Fiber Communication Conference and Exposition (OFC/NFOEC), 2012 and the National Fiber Optic Engineers Conference.
Yasuki Sakurai et al., LCOS-Based Wavelength Blocker Array With Channel-by-Channel Variable Center Wavelength and Bandwidth. Published in: IEEE Photon. Technol. Let. 23 (2011), pp. 989-991.

* cited by examiner

*Primary Examiner* — Hanh Phan

(57) ABSTRACT

Example embodiments of the present invention relate to An optical node comprising of at least two optical degrees; a plurality of directionless add/drop ports; and at least one wavelength equalizing array, wherein the at least one wavelength equalizing array is used to both select wavelengths for each degree, and to perform directionless steering for the add/drop ports.

3 Claims, 28 Drawing Sheets

METHOD AND APPARATUS FOR CONSTRUCTION OF COMPACT OPTICAL NODES USING WAVELENGTH EQUALIZING ARRAYS

RELATED APPLICATION

None

BACKGROUND

As the bandwidth needs of end customers increases, larger amounts of optical bandwidth will need to be manipulated closer to the end customers. A new breed of optical processing equipment will be needed to provide high levels of optical bandwidth manipulation at the lower cost points demanded at the networks closest to the end customers. This new breed of optical processing equipment will require new levels of optical signal processing integration.

SUMMARY

A method and corresponding apparatus in an example embodiment of the present invention relates to providing a means of manipulating optical signals at the lowest possible cost points. The example embodiment includes a compact light processing apparatus—utilizing wavelength equalizing arrays—whose level of equipment redundancy matches the economics associated with the location of the apparatus within provider networks.

According to an embodiment of the present invention, there is provided an optical node comprising of at least two optical degrees, a plurality of directionless add/drop ports, and at least one wavelength equalizing array; wherein the at least one wavelength equalizing array is used to both select wavelengths for each optical degree and to perform directionless steering for the plurality of directionless add/drop ports. According to another embodiment of the invention, an apparatus referred to as a ROADM circuit pack is described. The ROADM circuit pack is comprised of a least two optical degrees and a port common to the at least two optical degrees, wherein the common port is connectable to a plurality of directionless add/drop ports, and wherein wavelengths from the common port may be directed to any of the at least two degrees residing on the circuit pack. The ROADM circuit pack may additionally comprise of at least one wavelength equalizing array, wherein the at least one wavelength equalizing array is used to both select wavelengths for each degree, and to perform directionless steering of wavelengths to and from the plurality of directionless add/drop ports. The at least one equalizing array may further be utilized to aid in providing additional functionality to the ROADM circuit pack, including, but not limited to, a channel monitoring function and the functionality of at least one embedded transponder.

The invention also provides a method for constructing an optical node utilizing a wavelength equalizing array. The method comprises of allocating a first set of wavelength equalizers for selection of a first set of wavelengths for transmission from a first optical degree, and allocating at least a second set of wavelength equalizers for selection of at least a second set of wavelengths for transmission from at least a second optical degree; wherein the number of optical degrees comprising the node is used to determine the number of wavelength equalizers assigned to each set. The method further includes allocating an additional set of wavelength equalizers for selection of an additional set of wavelengths for transmission from a common port connectable to a plurality of directionless add/drop ports. The method may additionally include allocating wavelength equalizers for a channel monitoring function and for an embedded transponder function.

The present invention provides various advantages over conventional methods and apparatus for construction of optical nodes. The advantages arise from the use of a single wavelength equalizing array that allows for the construction of highly integrated optical nodes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
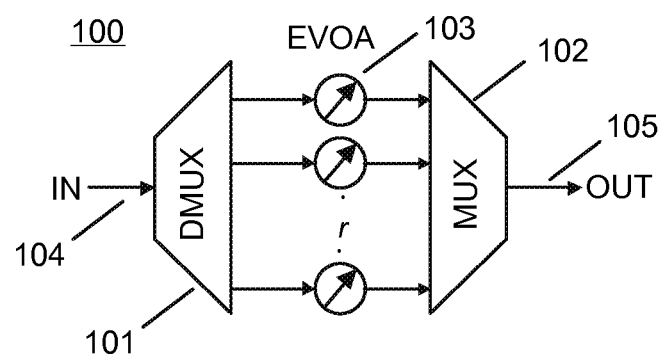
FIG. 1 is an illustration of a wavelength equalizer, also often referred to as a wavelength blocker.

FIG. 1 is an illustration of a wavelength equalizer 100 comprising of; a wavelength de-multiplexer (DMUX) 101 that is used to separate a composite Wavelength Division Multiplexed (WDM) signal arriving at input 104 into r number of individual wavelengths, a plurality of Electrical Variable Optical Attenuators (EVOAs) 103 used to partially or fully attenuate the individual wavelengths, and a wavelength multiplexer (MUX) 102 that is used to combine r number of individual wavelengths into a composite Wavelength Division Multiplexed (WDM) signal for transmission at output 105. In addition to its optical elements (MUX, DMUX, and EVOAs), the wavelength equalizer 100 contains electronic circuitry (not shown) used to control the EVOAs, and a user interface (not shown) that is used to program the electronic circuitry of the EVOAs. The optical processing of each individual wavelength may be independently controlled. The optical power level of each individual wavelength may be attenuated by a programmable amount by sending a command through the user interface. The command is used by the electronic circuitry to set the attenuation value of the appropriate EVOA. Additionally, each individual EVOA can be program to substantially block the light associated with an incoming optical wavelength. Controlled attenuation ranges for typical EVOAs are 0 to 15 dB, or 0 to 25 dB. Blocking attenuation is typically 35 dB or 40 dB.

The device 100 is referred to as a wavelength equalizer because the EVOAs 103 can be used to equalize the power levels of all the wavelengths inputted into the device. Therefore, if wavelengths with unequal power levels are applied to input 104, the EVOAs can be configured so that the wavelengths exiting at 105 have substantially the same optical power level with respect to one another. The device 100 is also often referred to as a wavelength blocker, or as a one-by-one wavelength selective switch.

Figure 2:
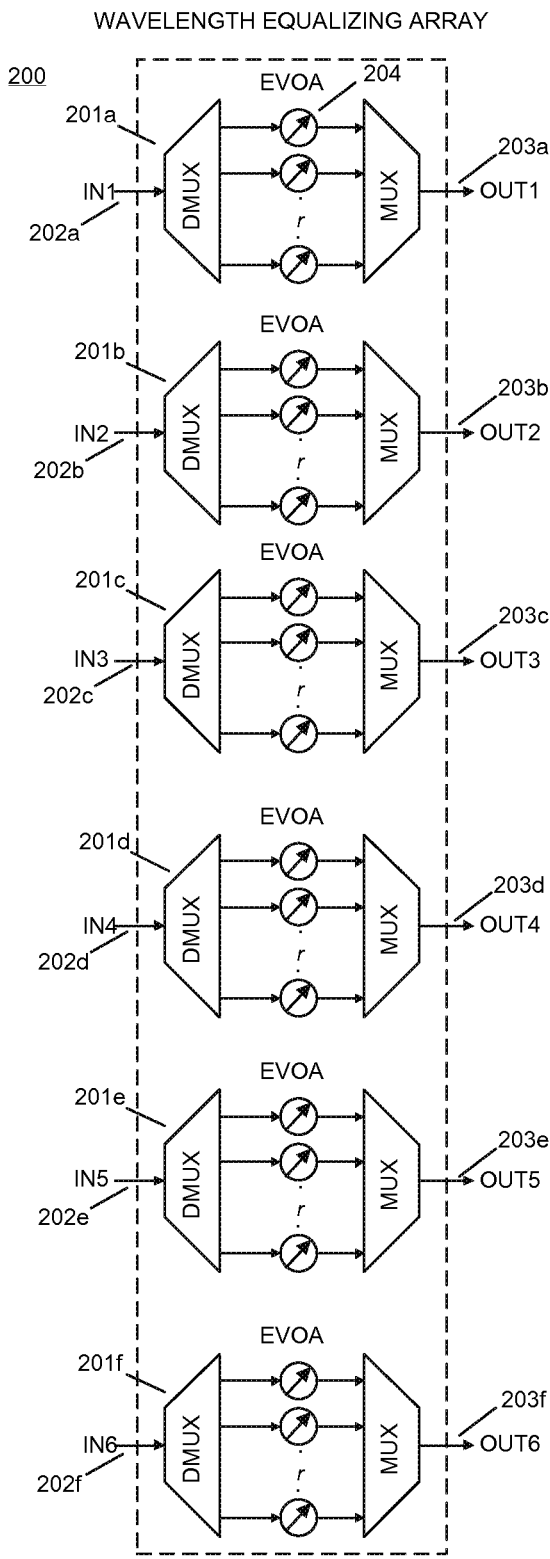
FIG. 2 is an illustration of a wavelength equalizing array containing six wavelength equalizers.

FIG. 2 is an illustration of a wavelength equalizing array 200 contained within a single device. The wavelength equalizing array 200 contains six wavelength equalizers 201a-f that may be of the type 100 illustrated in FIG. 1. The wavelength equalizing array 200 contains six optical inputs (IN1-IN6) 202a-f that are attached to the inputs of the wavelength equalizers, and six optical outputs (OUT1-OUT6) 203a-f that are attached to the outputs of the wavelength equalizers. The electronic circuitry (not shown) used to control the EVOAs 204 may reside within the wavelength equalizing array device, or may reside external to the wavelength equalizing array device.

Figure 3:
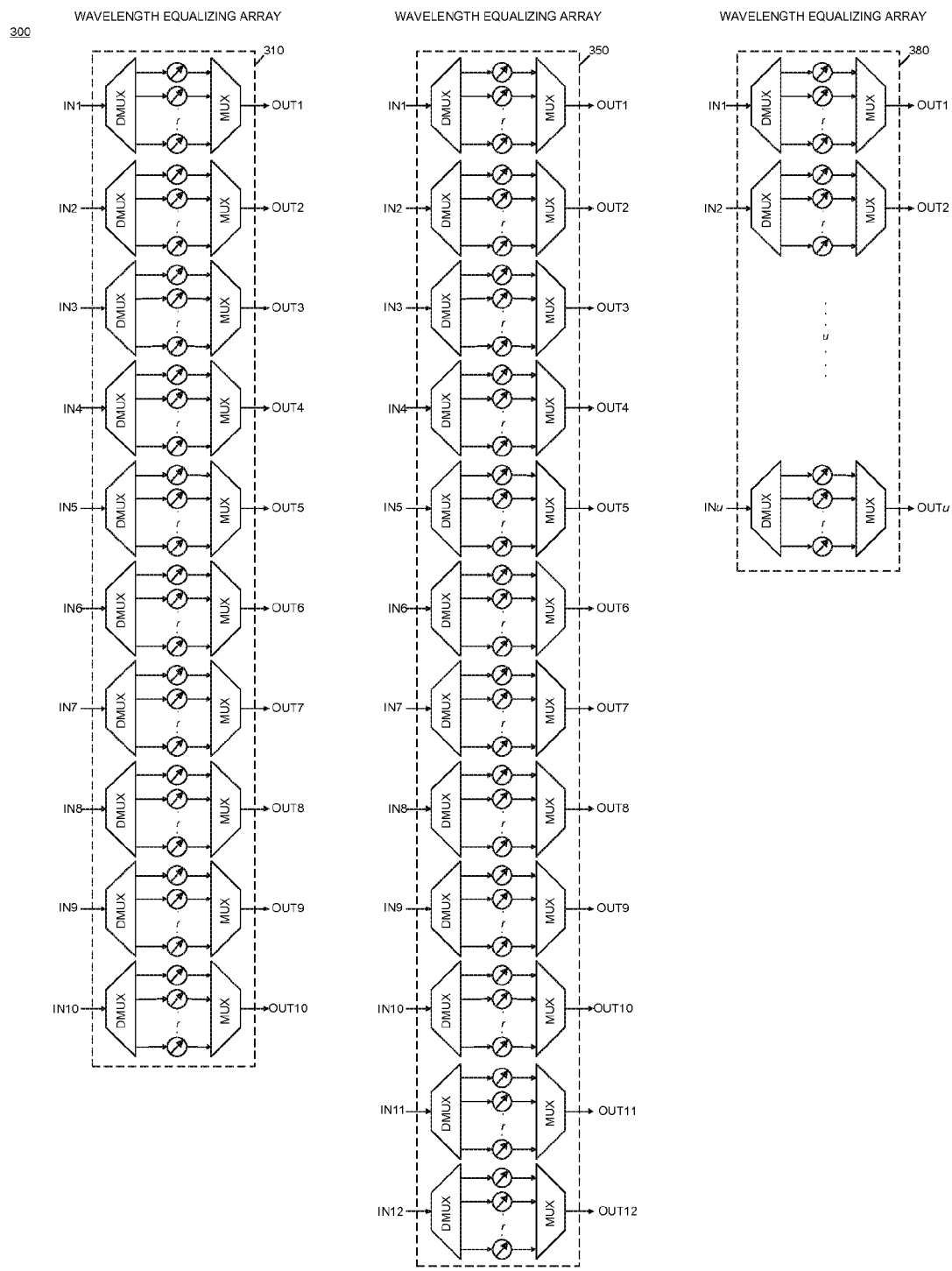
FIG. 3 is an illustration of three wavelength equalizing arrays; one containing ten wavelength equalizers, one containing twelve wavelength equalizers, and one containing u wavelength equalizers.

FIG. 3 (300) is an illustration of three different wavelength equalizing arrays 310 350, and 380. Each array may be contained within a single device. Wavelength equalizing array 310 contains ten wavelength equalizers that may be of the type 100 illustrated in FIG. 1. Wavelength equalizing array 350 contains twelve wavelength equalizers that may be of the type 100 illustrated in FIG. 1. Wavelength equalizing array 380 contains u wavelength equalizers that may be of the type 100 illustrated in FIG. 1 (wherein u can be any integer value). Although wavelength equalizing arrays 200, 310, 350 and 380 illustrate arrays with six, ten, twelve and u wavelength equalizers respectively, in general there is no limit to the number of wavelength equalizers that can be placed within a single device. Therefore, arrays with sixteen, twenty-four, or thirty-two wavelength equalizers may be possible.

Multiple different technologies may be used to implement the wavelength equalizing arrays 200, 310, 350 and 380, including Planer Lightwave Circuit (PLC) technology and various free-space optical technologies such as Liquid Crystal on Silicon (LCoS). A single Liquid Crystal on Silicon substrate may be used to implement a wavelength equalizing array containing any number of wavelength equalizers. The Wavelength Processing Array (WPA-12) from Santec Corporation is an example of a commercially available wavelength equalizing array containing twelve wavelength equalizers. The wavelength equalizing arrays 200, 310, 350 and 380 may be implemented by placing PLC based EVOAs and multiplexers (Arrayed Waveguide Gratings (AWG)) on a single substrate.

Figure 4:
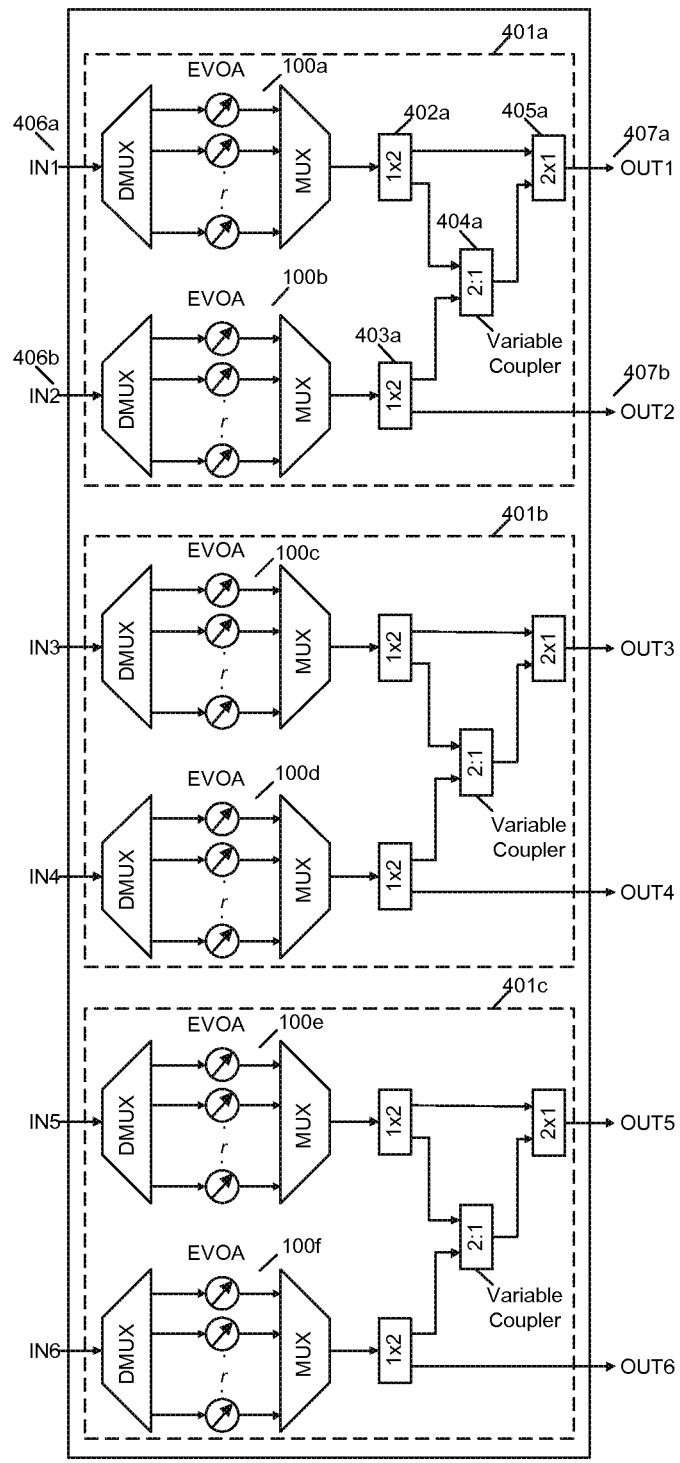
FIG. 4 is an illustration of a first embodiment of a wavelength equalizing array containing six wavelength equalizers that can be configured to be any combination of 1 by 1 wavelength selective switches or 2 by 1 wavelength selective switches.

PLC based technologies and free-space optical technologies also provide the means to augment the wavelength equalizing arrays with additional components in order to realize additional functionality. An example of this is illustrated in FIG. 4. FIG. 4 illustrates a wavelength equalizing array 400 that contains six wavelength equalizers 100*a-f* augmented with some additional optical components comprising of 1×2 optical switches, 2×1 optical switches, and variable optical couplers. The additional components provide the ability for two wavelength equalizers to perform either a 2 by 1 or 1 by 2 wavelength selective switch (WSS) function. A 1 by p wavelength selective switch is defined to be an optical device—with one WDM input port and p WDM output ports—that can be configured to direct individual wavelengths arriving on its input port to any of its p output ports. Similarly, a p by 1 wavelength selective switch is defined to be an optical device—with one WDM output port and p WDM input ports—that can be configured to direct individual wavelengths arriving on any of its input ports to its single output port.

In FIG. 4 three 2 by 1 WSS functions are implemented 401*a-c*. For 2 by 1 WSS 401*a*, the variable coupler 404*a* is used to combine the wavelengths from wavelength equalizers 100*a* and 100*b*. For this case, 1 by 2 optical switches 402*a* and 403*a* are both configured to forward their incoming wavelengths to variable coupler 404*a*, and variable coupler 404*a* is configured as a 50/50 optical coupler (i.e., a coupler that forwards an equal amount of light from each of its two inputs). If wavelength number 1 (with frequency 1) is routed from IN1 406*a* to OUT1 407*a*, then wavelength number 1 (with frequency 1) arriving at IN2 406*b* must be blocked by wavelength equalizer 100*b* so as not to cause contention with the wavelength number 1 exiting wavelength equalizer 100*a*. By appropriately blocking and passing wavelengths through 100*a* and 100*b*, up to r number of wavelengths may exit through port OUT1 407*a*.

The variable coupler 404*a* provides the ability to forward unequal amounts of light from wavelength equalizers 100*a* and 100*b* to output port OUT1. This may be a useful feature when, for example, the wavelengths arriving at input port IN1 406*a* all have substantially lower optical power levels than the wavelengths arriving at input port IN2 406*b*. For this case, variable attenuator 404*a* may be programmed to allow more light from 100*a* and less light from 100*b*. Alternatively, the variable coupler 404*a* may be replaced with a fixed coupler that forwards an equal amount of light from each of its two inputs.

In FIG. 4, optical switches 402*a*, 403*a*, and 405*a*, provide the ability for the two wavelength equalizers 100*a* and 100*b* to be configured as either individual 1 by 1 WSS devices or a single 2 by 1 WSS device. When switches 402*a* and 403*a* are configured to switch their input light to coupler 404*a*, then the two wavelength equalizers 100*a* and 100*b* are configured as a single 2 by 1 WSS. When switches 402*a* and 403*a* are configured to switch their input light away from coupler 404*a*, then the two wavelength equalizers 100*a* and 100*b* are configured as individual 1 by 1 WSS devices. Switch 405*a* is used to switch the output port OUT1 407*a* between the two functionalities (i.e., either a single 2 by 1 WSS or a single 1 by 1 WSS device).

Note that it's possible to eliminate switches 402*a* and 405*a* when a variable coupler is used that can substantially direct to its output port all the light from one of its input ports. For this case, the output from 100*a* is directly routed to the upper input of variable coupler 404*a*. Then when 401*a* is programmed to be two individual 1 by 1 WSS devices, variable coupler 404*a* is programmed to direct to its output all of the light from 100*a* and none of the light from switch 403*a*.

It can also be noted that each set of dual wavelength equalizers 401*a-c* can be used as 1 by 2 WSS devices by inputting signals to port OUT1 407*a* while outputting signals to ports IN1 406*a* and IN2 406*b* (i.e., operating the 2 by 1 WSS in the reverse direction).

It can also be noted that each set of dual wavelength equalizers 401*a-c* can be independently programmed to be either a single 2 by 1 WSS device or two individual 1 by 1 WSS devices. As an example, 401*a* may be programmed to be a 2 by 1 WSS device, while 401*b* and 401*c* may be programmed to be 1 by 1 WSS devices.

Although wavelength equalizing array 400 is shown as implemented with individual switches, multiplexers, and de-multiplexers, without departing from the spirit of the invention, the actual filtering and switching functions can be accomplished with other means, including using free-space optics wherein multiple switching and filtering functions are combined in order to accomplish the identical switching and filtering functionality.

Figure 5:
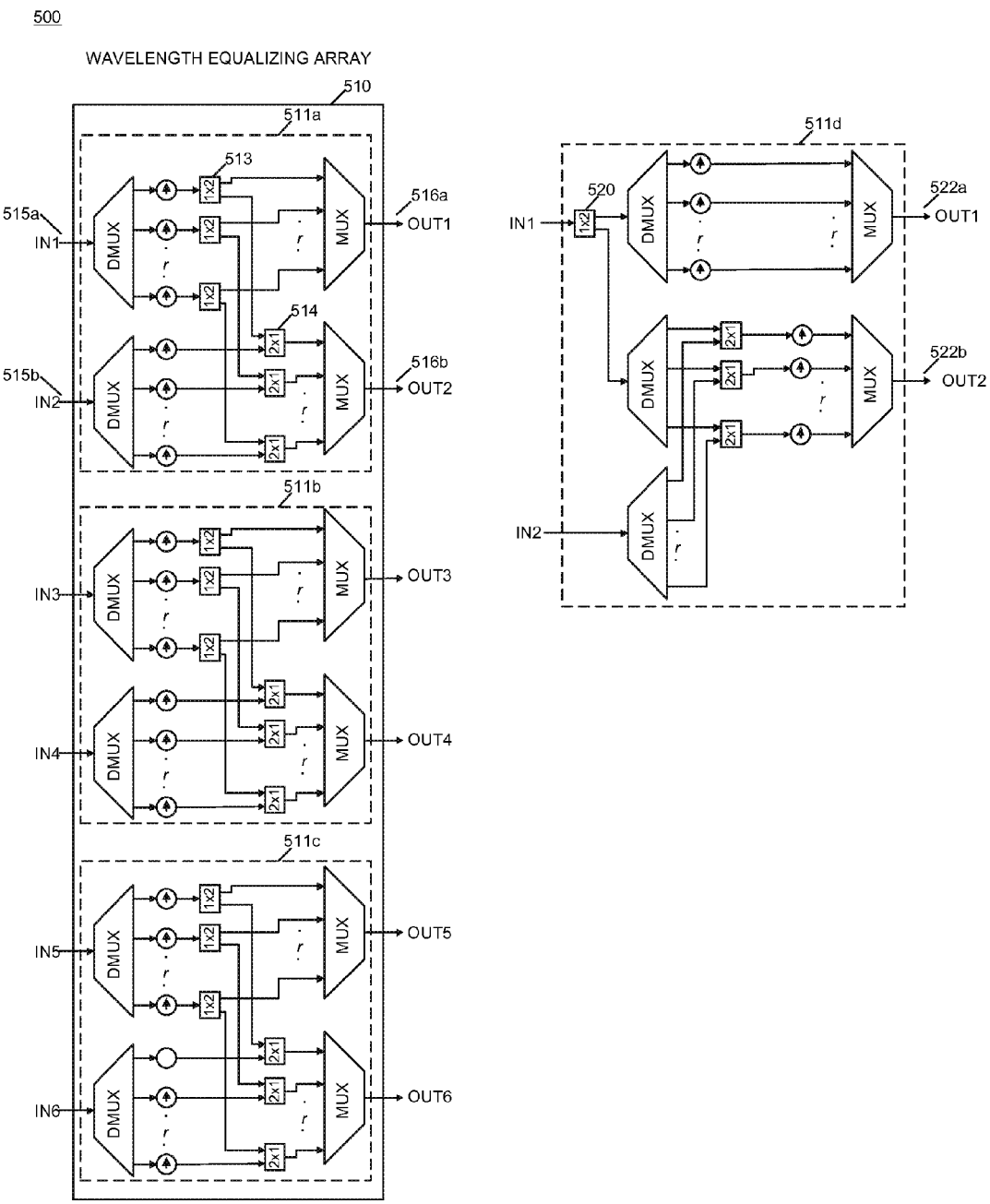
FIG. 5 is an illustration of a second embodiment of a wavelength equalizing array containing six wavelength equalizers that can be configured to be any combination of 1 by 1 wavelength selective switches or 2 by 1 wavelength selective switches.

FIG. 5 (500) illustrates an alternative method of implementing a six-input wavelength equalizing array 510 that can function as individual 1 by 1 WSS devices or 2 by 1 WSS devices. The advantage of implementation 510 over implementation 400 is that the 2 by 1 WSS instances 511*a-c* in 510 have lower insertion losses than the 2 by 1 WSS instances 401*a-c* in 400. This is because implementation 510 eliminates the large insertion loss of the variable coupler 404*a*. However, in order to eliminate the coupler, additional complexity is added in the form of 2r number of optical switch functions (1×2 and 2×1) 513, 514.

In the 510 implementation, individual 1 by 1 WSS functions are obtained by programming the optical switches 513 such that all wavelengths entering a given input INx are forwarded to the corresponding output OUTx. For instance, all the wavelengths entering input 515*a* are forwarded to output 516*a*, and not to output 516*b*. When using a set of dual wavelength equalizers to form a 2 by 1 WSS function (511*a*, for example), the optical switches 513 are programmed such that all wavelengths entering IN1 515*a* are forwarded to switches 514, and then switches 514 are used to route individual wavelengths to OUT2 516*b* from either wavelengths entering on port IN1 515*a* or port IN2 515*b*.

An alternative structure for the dual wavelength equalizers is 511*d*. In this structure r number of individual 1×2 switches are replaced with a single 1×2 switch 520 at the expense of an extra DMUX.

The set of dual wavelength equalizers 511*a-c* can operate as either 2 by 1 WSS devices or 1 by 2 WSS devices. For example, when operating instance 511*a* as a 2 by 1 device, input ports IN1 515*a* and IN2 515*b* and output port OUT2 516*b* are used. Alternatively, when operating instance 511*a* as a 1 by 2 device, ports OUT1 516*a*, OUT2 516*b* and in IN1 515*a* are used.

The dual wavelength equalizer 511*d* can operate as a 1 by 2 WSS device by running the device backwards using OUT2 522*b* as the input (not 522*a*).

Figure 6:
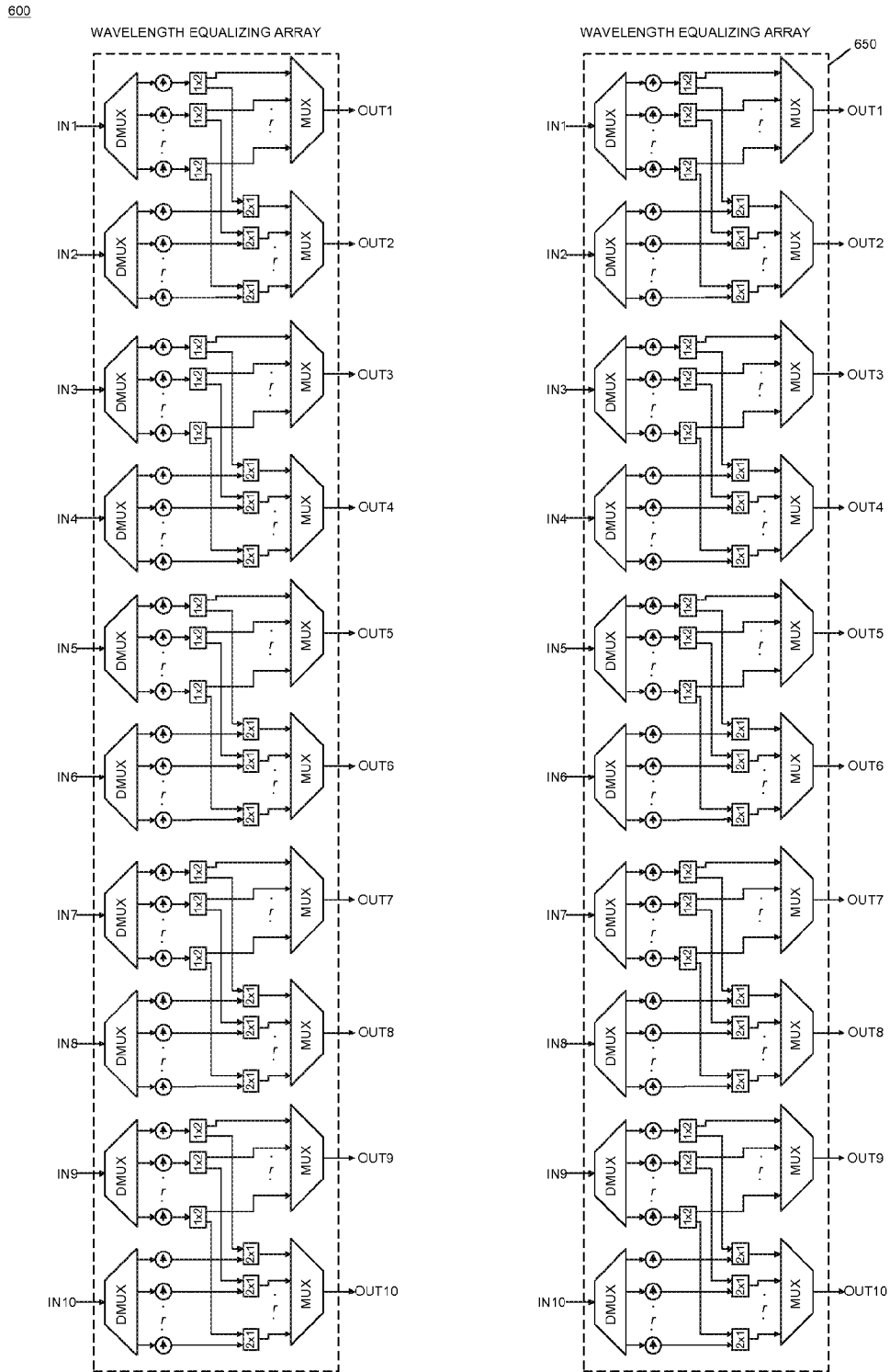
FIG. 6 is an illustration of a wavelength equalizing array containing ten wavelength equalizers that can be configured to be any combination of 1 by 1 wavelength selective switches or 2 by 1 wavelength selective switches.

FIG. 6 shows a wavelength equalizing array 600 that is constructed identically to the wavelength equalizing array 510, except that array 600 contains ten wavelength equalizers instead of only six.

Figure 7:
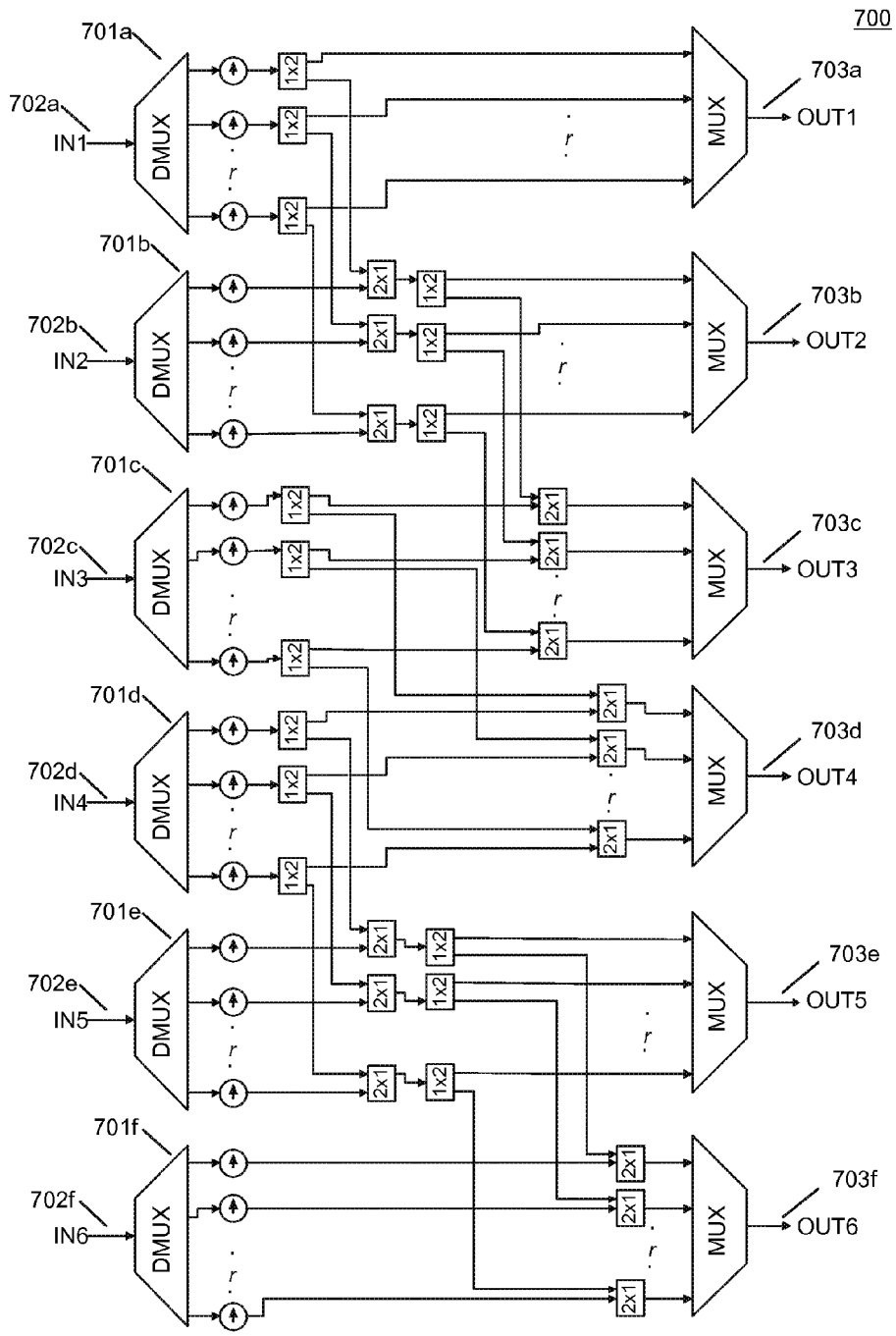
FIG. 7 is an illustration of a wavelength equalizing array containing six wavelength equalizers that can be configured to be any combination of 1 by 1 wavelength selective switches, 2 by 1 wavelength selective switches, or 3 by 1 wavelength selective switches.

FIG. 7 shows a wavelength equalizing array 700 containing six wavelength equalizers 701a-f that can be configured (by setting the 1×2, and 2×1 switches appropriately) as either 1 by 3 WSS devices, 1 by 2 WSS devices or 1 by 1 WSS devices. A first 1 by 3 device is formed by the top three wavelength equalizers 701a-c (using IN1 702a, OUT1 703a, OUT2 703b, and OUT 3 703c), while a second 1 by 3 device is formed by the bottom three wavelength equalizers 701d-f (using IN4 702d, OUT4 703d, OUT5 703e, and OUT 6 703f). In order to use the wavelength equalizing array as 3 by 1 WSS devices, the wavelength equalizing array is used in the reverse direction, using all output ports as inputs, and using the IN1 port 702a as the output port for the top 3 by 1, and using the IN4 port 702d as the output port for the bottom 3 by 1.

The wavelength equalizing array 700 can alternatively be used to create three 1 by 2 WSS devices by using IN1 702a, OUT1 703a and OUT2 703b as the first 1 by 2 WSS, using IN3 702c, OUT3 703c, and OUT4 703d as the second 1 by 2 WSS, and using IN5 702e, OUT5 703e, and OUT6 703f as the third 1 by 2 WSS. Similarly, the wavelength equalizing array 700 can be used to create three 2 by 1 WSS devices by using IN1 702a, IN2 702b, and OUT2 703b as the first 2 by 1 WSS, using IN3 702c, IN4 702d, and OUT4 703d as the second 2 by 1 WSS, and using IN5 702e, IN6 702f, and OUT6 703f as the third 2 by 1 WSS.

Finally the wavelength equalizing array 700 can be used to create six 1 by 1 WSS devices by programming all switches such that all input wavelengths arriving on a given port INx are forwarded to the corresponding output port OUTx.

Any combination of 1 by 3 WSS devices, 1 by 2 WSS devices, and 1 by 1 WSS devices can be created using the wavelength equalizing array 700. For instance, wavelength equalizing array 700 can be used to implement a single 1 by 3 WSS device, a single 1 by 2 WSS device, and a single 1 by 1 WSS device. Alternatively, the wavelength equalizing array 700 can be used to implement two 1 by 2 WSS devices, and two 1 by 1 WSS devices. In this way, a single wavelength equalizing array device can be used in a product to create a product with multiple distinct capabilities, while not incurring the cost and complexity of creating a single 6 by 6 WSS device.

Although wavelength equalizing array 700 is shown as implemented with individual switches, multiplexers, and de-multiplexers, the actual switching functions can be accomplished with free-space optics wherein multiple switching and filtering functions are combined in order to accomplish identical switching and filtering functionality.

In general, for a wavelength equalizing array that can be configured as either 1 by 1 WSS devices or 2 by 1 WSS devices, if the device can be used to construct a maximum of n 1 by 1 WSS devices, then the maximum number of 2 by 1 WSS devices that the array can be used to create is n/2 devices, since each 2 by 1 device requires the resources associated with two 1 by 1 WSS devices.

For a wavelength equalizing array with a maximum of n number of 1 by 1 WSS devices that can be configured as either 1 by 1 WSS devices or 2 by 1 WSS devices, if the device is configured to have m number of 1 by 1 WSS devices, then the maximum number of 2 by 1 devices that can also be configured is equal to (n−m)/2.

For a wavelength equalizing array that can be configured as either 1 by 1 WSS devices or 3 by 1 WSS devices, if the device can be used to construct a maximum of n 1 by 1 WSS devices, then the maximum number of 3 by 1 WSS devices that the array can be used to create is n/3 devices, since each 3 by 1 device requires the resources associated with three 1 by 1 WSS devices.

For a wavelength equalizing array with a maximum of n number of 1 by 1 WSS devices that can be configured as either 1 by 1 WSS devices or 3 by 1 WSS devices, if the device is configured to have m number of 1 by 1 WSS devices, then the maximum number of 3 by 1 devices that can also be configured is equal to (n−m)/3.

In general, a wavelength equalizing array can be partitioned into an array of $k_1$ 1×1, $k_2$ 1×2, $k_3$ 1×3 . . . , $k_p$ 1×p wavelength selective switches, where p is any integer number greater than 1, and $k_j$ is any integer value greater than or equal to 0. For this case, if n is the maximum number of 1×1 wavelength selective switches in the at least one wavelength equalizing array, then $\Sum_{i=1}^{P} i \times k_i \leq n$.

Figure 8:
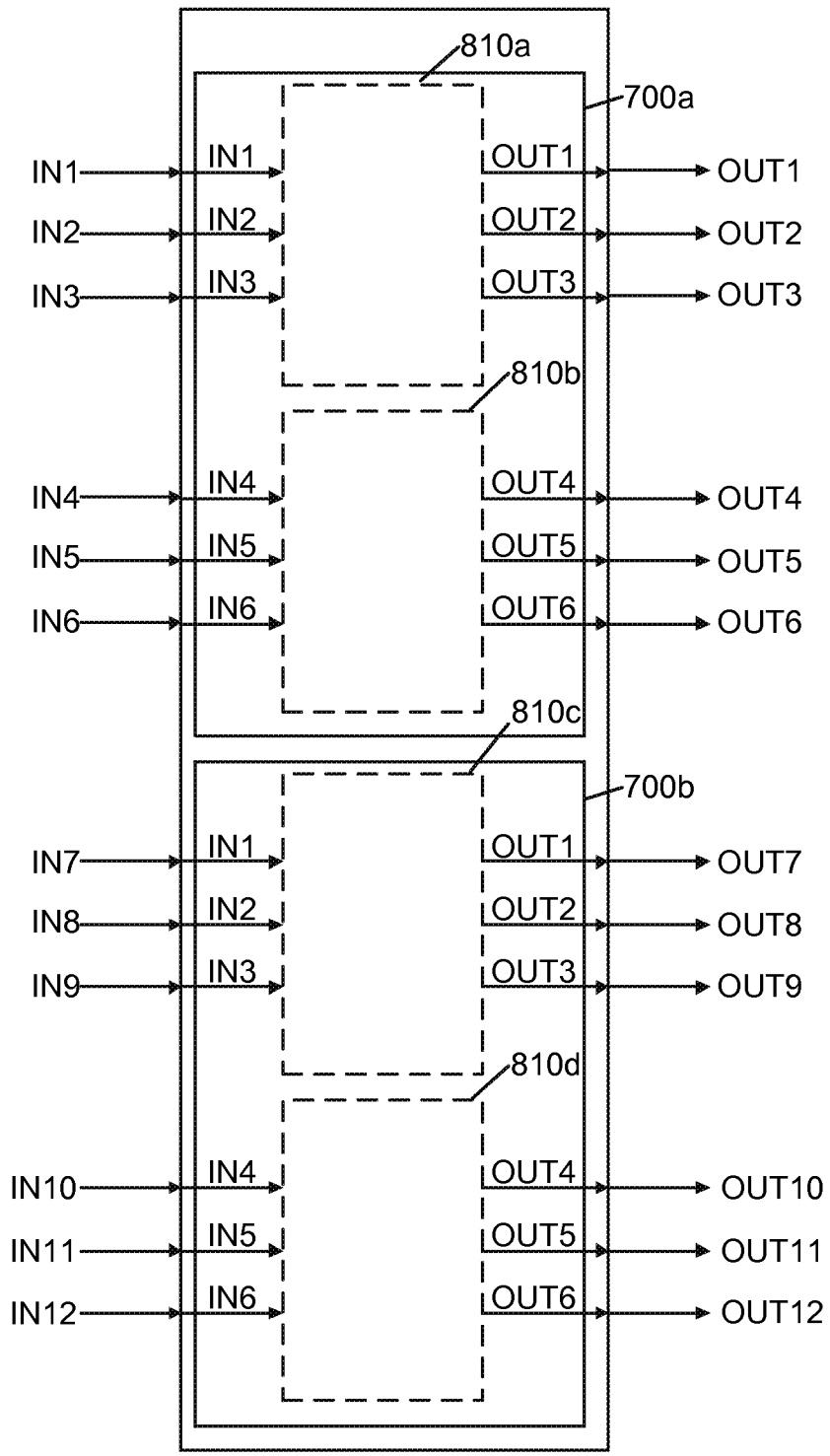
FIG. 8 is an illustration of a wavelength equalizing array containing twelve wavelength equalizers that can be configured to be any combination of 1 by 1 wavelength selective switches, 2 by 1 wavelength selective switches, or 3 by 1 wavelength selective switches.

FIG. 8 depicts a wavelength equalizing array 800 containing two instances (700a, 700b) of wavelength equalizing array 700. In FIG. 8, the wavelength equalizing array 800 can be partitioned into four 1 by 3 WSS devices 810a-d.

Figure 9:
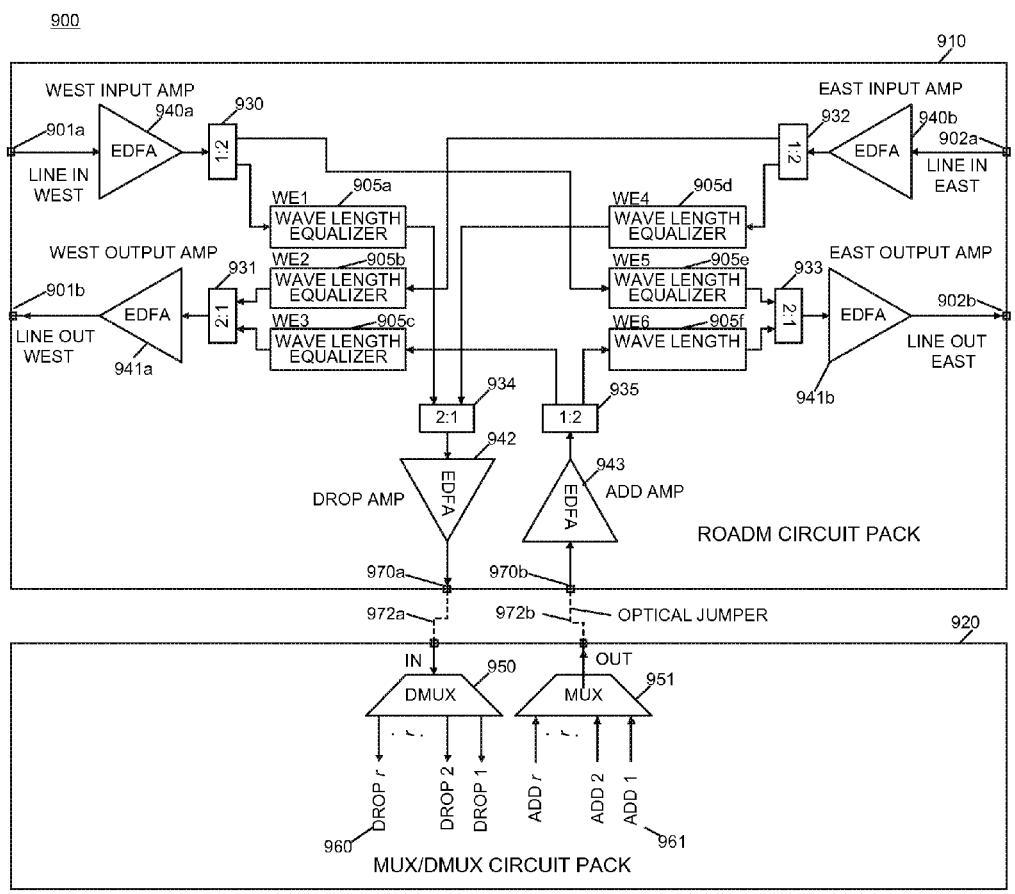
FIG. 9 is an illustration of an optical node comprising of a two degree ROADM on a circuit pack with an external multiplexer/de-multiplexer circuit pack.

FIG. 9 shows an optical node 900 comprising of a two-degree Reconfigurable Optical Add/Drop Multiplexer (ROADM) 910 on a circuit pack with an external multiplexer/de-multiplexer circuit pack 920. Each line interface on the ROADM (Line In/Out West 901a-b, and Line In/OUT East 902a-b) represents an optical degree. In addition, optical node 900 contains a port common to both optical degrees (common port 970a-b) that is connectable to a plurality of directionless add/drop ports 961 and 960. Six wavelength equalizers 905a-f are used in the design—three for each degree. Wavelength equalizer WE1 905a is used to either pass or block wavelengths from the West Line interface 901a to the multiplexer/de-multiplexer circuit pack 920 attached to the common port 970a-b. Similarly, wavelength equalizer WE4 905d is used to either pass or block wavelengths from the East Line interface 902a to the multiplexer/de-multiplexer circuit pack 920 attached to the common port 970a-b. The wavelengths from WE1 905a and WE4 905d are combined together using optical coupler 934, and then they are forwarded to the multiplexer/de-multiplexer circuit pack 920 via optional optical amplifier 942 through the common optical port 970a.

Wavelength equalizer WE3 905c is used to either pass or block wavelengths from the common port 970b to the West Line interface 901b. It is also used to equalize the power levels of the wavelengths exiting out the West Line interface 901b from the multiplexer/de-multiplexer circuit pack 920. Similarly, wavelength equalizer WE6 905f is used to either pass or block wavelengths from the common port 970b to the East Line interface 902b. It is also used to equalize the power levels of the wavelengths exiting out the East Line interface 902b from the multiplexer/de-multiplexer circuit pack 920.

Wavelength equalizer WE2 905b is used to either pass or block wavelengths from the East Line interface 902a to the West Line interface 901b. It is also used to equalize the power levels of the wavelengths exiting out the West Line interface 901b from the East Line interface 902a. Similarly, wavelength equalizer WE5 905e is used to either pass or block wavelengths from the West Line interface 901a to the East Line interface 902b. It is also used to equalize the power levels of the wavelengths exiting out the East Line interface 902b from the West Line interface 901a.

Optional input optical amplifiers 940a-b are used to optically amplify wavelengths arriving from the West 901a and East 902a Line interfaces. These amplifiers can be constructed using Erbium Doped Fiber Amplifier (EDFA) technology or some other suitable technology.

Optical coupler 930 is used to broadcast all the wavelengths from the West Line interface 901a to both wavelength equalizer WE1 905a and WE5 905e. Similarly, optical coupler 932 is used to broadcast all the wavelengths from the East Line interface 902a to both wavelength equalizer WE2 905b and WE4 905d.

Optical coupler 931 is used to combine the wavelengths from wavelength equalizers WE2 905b and WE3 905c into one composite WDM signal that is optically amplified with output optical amplifier 941a. Similarly, optical coupler 933 is used to combine the wavelengths from wavelength equalizers WE5 905e and WE6 905f into one composite WDM signal that is optically amplified with output optical amplifier 941b.

Optional optical amplifier 943 receives added wavelengths from the multiplexer/de-multiplexer circuit pack 920 via port 970b, and optically amplifies the wavelengths before forwarding the amplified wavelengths to optical coupler 935. Optical coupler 935 is used to broadcast the added wavelengths to both the West Line interface 901b and East Line interface 902b via WE3 905c and WE6 905f respectively.

Located on the multiplexer/de-multiplexer circuit pack 920 is a plurality (r) of add/drop ports 961, 960. Individual wavelengths are added to the multiplexer/de-multiplexer circuit pack and then multiplexed via multiplexer 951 into a composite WDM signal that is then forwarded to the ROADM circuit pack 910. In the drop direction on 920, a composite WDM signal is received from the common port 970a of the ROADM circuit pack 910 and then it is de-multiplexed into individual wavelengths using de-multiplexer 950. Each de-multiplexed wavelength is then forwarded to a specific drop port 960 of the de-multiplexer. The multiplexer and de-multiplexer may be implemented using Arrayed Waveguide Grating (AWG) technology, or some other suitable technology. Devices that process individual wavelengths for transmission—such as optical transponders—can be used to supply and receive wavelengths to and from the add/drop ports. The common port 970a-b of the ROADM circuit pack 910 is connected to the multiplexer/de-multiplexer circuit pack 920 using two optical jumper interconnections 972a-b.

As can be seen in 900, a single multiplexer/de-multiplexer circuit pack is used to add and drop wavelengths to/from both the East and West Line interfaces. Therefore, a transponder that is attached to an add/drop port of the multiplexer/de-multiplexer circuit pack 920, can forward and receive wavelengths to and from any of the two degrees of the ROADM circuit pack. Because of this, the add/drop ports are referred to as directionless add/drop ports—meaning the add drop ports are not dedicated to a particular direction of the optical node. The wavelength equalizers on the ROADM circuit pack are used to steer the added and dropped wavelengths to and from each degree by appropriately blocking or passing wavelengths. Therefore, the wavelength equalizers WE1 905a, WE3 905c, WE4 905d, and WE6 905f are said to perform directionless steering for the add/drop ports for each degree.

Additionally, the wavelength equalizers on the ROADM circuit pack are used to select which wavelengths from the Line input interfaces are allowed to exit a given output interface (degree), by appropriately blocking or passing wavelengths.

Both the ROADM circuit pack 910 and the multiplexer/de-multiplexer circuit pack 920 may contain electrical connectors that allow the two circuit packs to be plugged into an electrical back plane of an electrical shelf (not shown). The multiplexer/de-multiplexer circuit 920 pack may contain active components (i.e., components requiring electrical power in order to operate), or it may contain only passive components (athermal AWGs, for example). If the multiplexer/de-multiplexer circuit pack 920 contains only passive components, then the multiplexer/de-multiplexer circuit pack could optionally be placed outside of the electrical shelf.

Figure 10:
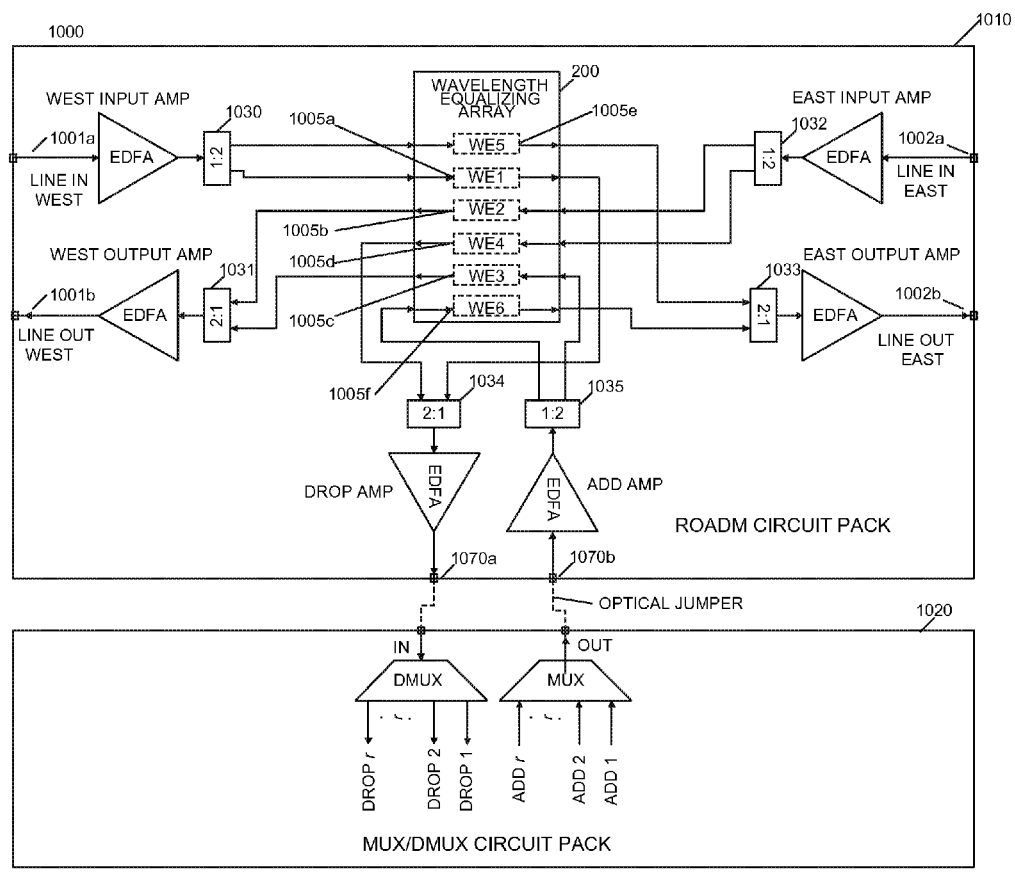
FIG. 10 is an illustration of an optical node comprising of a two degree ROADM on a circuit pack utilizing a wavelength equalizing array containing six wavelength equalizers, with an external multiplexer/de-multiplexer circuit pack.

FIG. 10 shows a two degree optical node 1000 that is identical to the optical node 900, except that a single wavelength equalizing array 200 is used to supply all the required wavelength equalizers needed to construct the optical node. (Alternatively, multiple smaller wavelength equalizing arrays could be utilized.) The wavelength equalizers WE1-WE6 in 1000 correspond to the wavelength equalizers WE1-WE6 in 900. More specifically WE1 1005a in ROADM circuit pack 1010 corresponds WE1 905a in ROADM circuit pack 910, WE2 1005b in 1010 corresponds WE2 905b in 910, WE3 1005c in 1010 corresponds WE3 905c in 910, WE4 1005d in 1010 corresponds WE4 905d in 910, WE5 1005e in 1010 corresponds WE5 905e in 910, and WE6 1005f in 1010 corresponds WE6 905f in 910. Likewise the optical couplers 1030, 1031, 1032, 1033, 1034, and 1035 perform the same functions as their respective counterparts 930, 931, 932, 933, 934, and 935 within ROADM circuit pack 1010. The single wavelength equalizing array 200 may be identical to the wavelength equalizing array 200 discussed in reference to FIG. 2.

A single ROADM circuit pack 1010 supplies all the required optical circuitry to construct an optical node with two optical degrees, including input and output amplifiers for each degree, a common port 1070a-b connectable to a plurality of directionless add/drop ports, optical supervisory channel circuitry (not shown), optical channel monitoring (not shown), and a single wavelength equalizing array 200 that is used to both select wavelengths for each optical degree (using WE2 1005b and WE3 1005c for the West degree 1001b, and using WE5 1005e and WE6 1005f for the East degree 1002b) and to perform directionless steering for the plurality of directionless add/drop ports (using WE1 1005a and WE4 1005d in the drop direction, and using WE3 1005c and WE6 1005f in the add direction).

As can be seen in 1000, a single multiplexer/de-multiplexer circuit pack 1020 is used to add and drop wavelengths to/from both the East 1002a-b and West 1001a-b Line interfaces. Therefore, a transponder (not shown) that is attached to an add/drop port of the multiplexer/de-multiplexer circuit pack 1020, can forward and receive wavelengths to/from any of the two degrees of the ROADM circuit pack. Because of this, the add/drop ports are referred to as directionless add/drop ports—meaning the add drop ports are not dedicated to a particular direction of the optical node. The wavelength equalizers on the ROADM circuit pack are used to steer the added and dropped wavelengths to and from each degree by appropriately blocking or passing wavelengths. Therefore, the wavelength equalizers are said to perform directionless steering for the add/drop ports.

Additionally, the wavelength equalizers on the ROADM circuit pack 1010 are used to select which wavelengths from the Line input interfaces are allowed to exit a given output interface (degree), by appropriately blocking or passing wavelengths.

The wavelength equalizing array saves physical space and electrical power by utilizing common optics and electronics for all the wavelength equalizers in the array, thus making it more suitable for low-cost compact edge-of-network applications. The single wavelength equalizing array also provides a means to simplify the construction of the ROADM circuit pack that it is placed upon.

A preferred embodiment utilizes a "single" wavelength equalizing array to construct an optical node. Other embodiments may include using more than one wavelength equalizing array.

A preferred embodiment is to construct an optical node of at least two optical degrees using both a first circuit pack and a second circuit pack, wherein the optical node contains at least one wavelength equalizing array and a plurality of directionless add/drop ports, and wherein the at least one wavelength equalizing array is contained on the first circuit pack, and wherein the plurality of direction less add/drop ports are contained on the second circuit pack.

Another embodiment comprises of an optical node of at least two optical degrees, implemented using a single circuit pack, wherein the optical node contains at least one wavelength equalizing array and a plurality of directionless add/drop ports, and wherein the at least one wavelength equalizing array and the plurality of directionless add/drop ports are contained on the single circuit pack.

Another preferred embodiment includes a ROADM circuit pack, comprising of at least two optical degrees, and a common port connectable to a plurality of directionless add/drop ports, wherein wavelengths from the common port may be directed to any of the at least two optical degrees. Additionally, wavelengths from the at least two optical degrees may be directed to the common port of the ROADM circuit pack. The embodiment may further include input optical amplification and output optical amplification for each optical degree. The ROADM circuit pack may further comprise of at least one wavelength equalizing array, wherein the at least one wavelength equalizing array provides a means to both select wavelengths for each degree, and to perform directionless steering of wavelengths to and from the plurality of directionless add/drop ports, as illustrated in reference to the ROADM shown in FIG. 10. In a preferred embodiment, a single wavelength equalizing array is used to construct the ROADM circuit pack. The at least one wavelength equalizing array may be constructed using a single Liquid Crystal on Silicon substrate, or it may be constructed using planar lightwave circuitry.

Figure 11:
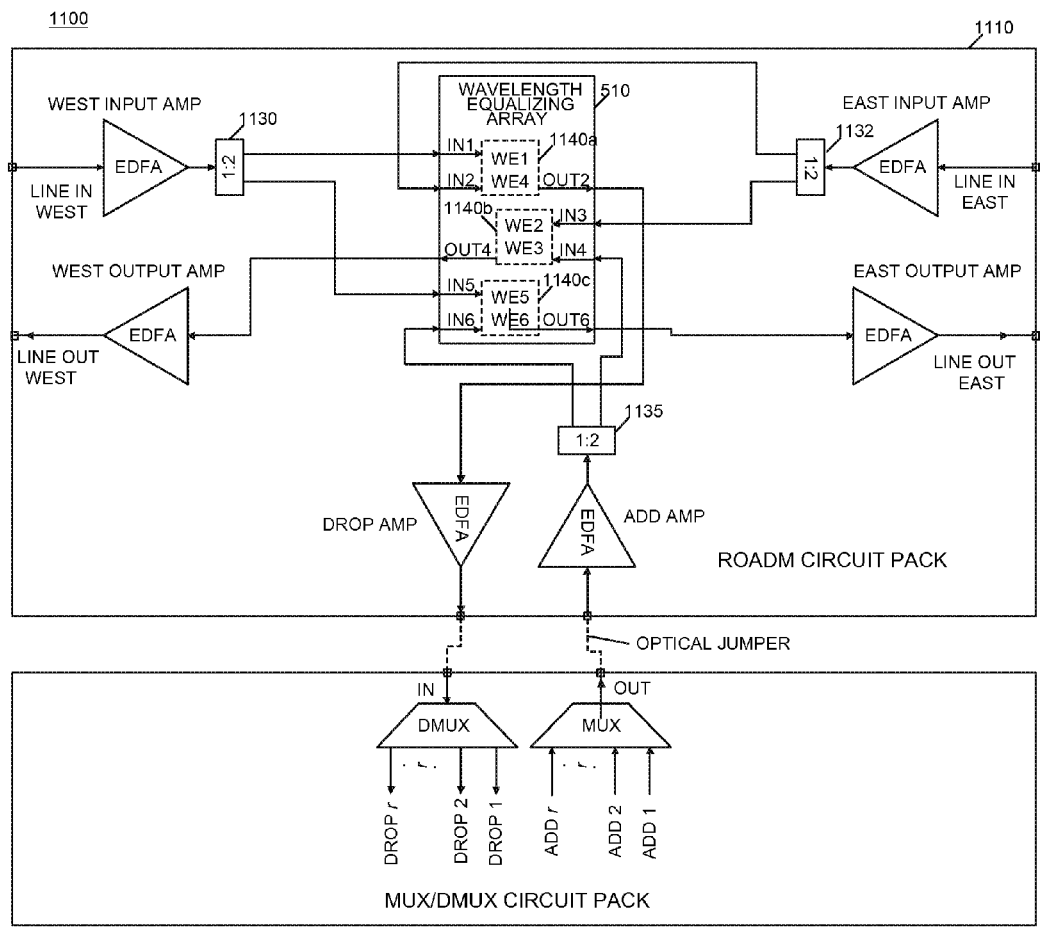
FIG. 11 is an illustration of an alternative embodiment optical node comprising of a two degree ROADM on a circuit pack utilizing a wavelength equalizing array containing six wavelength equalizers, with an external multiplexer/de-multiplexer circuit pack.

FIG. 11 shows a two degree optical node 1100 that is identical to the optical node 900, except that a single wavelength equalizing array 510 is used to supply all the required wavelength equalizers needed to construct the optical node. The wavelength equalizing array 510 may be identical to the wavelength equalizing array that was described in reference to FIG. 5.

This wavelength equalizing array 510 can be configured to perform the function of multiple 2 by 1 WSS devices. Therefore, the function of the optical couplers 931, 933, and 934 of optical node 900 are additionally absorbed within the wavelength equalizing array 510. The 2 by 1 WSS function 1140*a* performs the function of WE1 905*a*, WE4 905*d*, and optical coupler 934 within optical node 900, while the 2 by 1 WSS function 1140*b* performs the function of WE2 905*b*, WE3 905*c*, and optical coupler 931 within optical node 900, and the 2 by 1 WSS function 1140*c* performs the function of WE5 905*e*, WE6 905*f*, and optical coupler 933 within optical node 900. Optical couplers 1130, 1132, and 1135 perform the same functions as their respective counterparts 930, 932, and 935 within ROADM circuit pack 910. As can be seen from FIG. 11, using the wavelength equalizing array 510 in place of wavelength equalizing array 200 further simplifies the ROADM circuit pack due to the additional level of integration.

Figure 12:
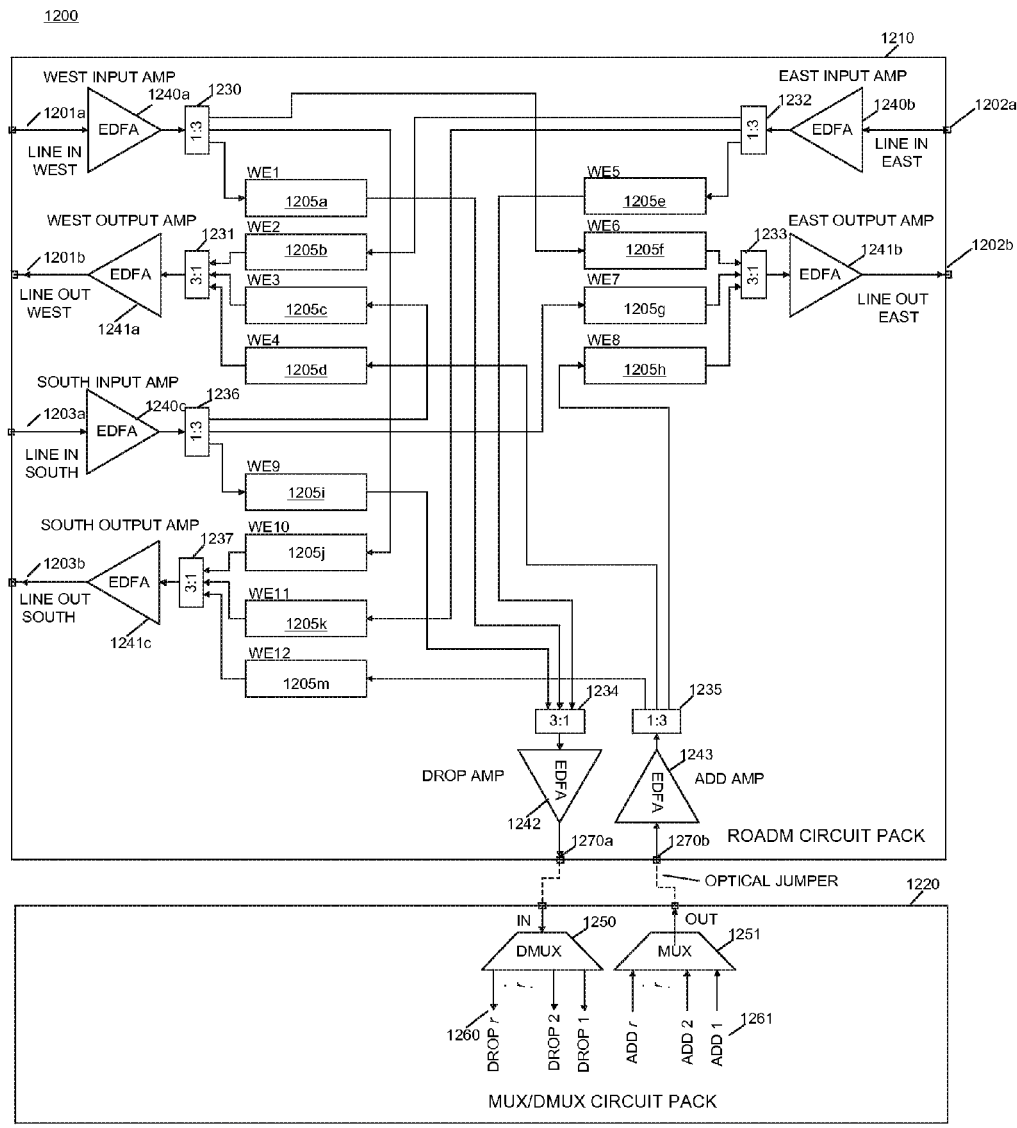
FIG. 12 is an illustration of an optical node comprising of a three degree ROADM on a circuit pack with an external multiplexer/de-multiplexer circuit pack.

FIG. 12 shows an optical node 1200 comprising of a three-degree Reconfigurable Optical Add/Drop Multiplexer (ROADM) 1210 on a circuit pack with an external multiplexer/de-multiplexer circuit pack 1220. Each line interface on the ROADM (Line In/Out West 1201*a-b*, Line In/OUT East 1202*a-b*, and Line In/OUT South 1203*a-b*) represents an optical degree. Twelve wavelength equalizers are used in the design—four for each degree. Wavelength equalizer WE1 1205*a* is used to either pass or block wavelengths from the West Line interface 1201*a* to the multiplexer/de-multiplexer circuit pack 1220. Similarly, wavelength equalizer WE5 1205*e* and WE9 1205*i* are used to either pass or block wavelengths from the East 1202*a* and South 1203*a* Line interfaces to the multiplexer/de-multiplexer circuit pack 1220. The wavelengths from WE1 1205*a*, WE5 1205*e*, and WE9 1205*i* are combined together using optical coupler 1234, and then they are forwarded to the multiplexer/de-multiplexer circuit pack 1220 via optional optical amplifier 1242 through the common port 1270*a*.

Wavelength equalizer WE4 1205*d* is used to either pass or block wavelengths from the multiplexer/de-multiplexer circuit pack 1220 to the West Line interface 1201*b*. It is also used to equalize the power levels of the wavelengths exiting out the West Line interface 1201*b* from the multiplexer/de-multiplexer circuit pack 1220. Similarly, wavelength equalizers WE8 1205*h* and WE12 1205*m* are used to either pass or block wavelengths from the multiplexer/de-multiplexer circuit pack 1220 to the East 1202*b* and South 1203*b* Line interfaces. They are also used to equalize the power levels of the wavelengths exiting out the East 1202*b* and South 1203*b* Line interfaces from the multiplexer/de-multiplexer circuit pack 1220.

Wavelength equalizer WE2 1205*b* and WE3 1205*c* are used to either pass or block wavelengths from the East 1202*a* and South 1203*a* Line interfaces to the West Line interface 1201*b*. They are also used to equalize the power levels of the wavelengths exiting out the West Line interface 1201*b* from the East 1202*a* and South 1203*a* Line interfaces. Similarly, wavelength equalizers WE6 1205*f* and WE7 1205*g* are used to either pass or block wavelengths from the West 1201*a* and South 1203*a* Line interfaces to the East Line interface 1202*b*. They are also used to equalize the power levels of the wavelengths exiting out the East Line interface 1202*b* from the West 1201*a* and South 1203*a* Line interfaces. Lastly, wavelength equalizers WE10 1205*j* and WE11 1205*k* are used to either pass or block wavelengths from the West 1201*a* and East 1202*a* Line interfaces to the South Line interface 1203*b*. They are also used to equalize the power levels of the wavelengths exiting out the South Line interface 1203*b* from the West 1201*a* and East 1202*a* Line interfaces.

Optional input optical amplifiers 1240*a-c* are used to optically amplify wavelengths arriving from the West 1201*a*, East 1202*a*, and South 1203*a* Line interfaces.

Optical coupler 1230 is used to broadcast all the wavelengths from the West Line interface 1201*a* to wavelength equalizers WE1 1205*a*, WE6 1205*f*, and WE10 1205*j*. Similarly, optical coupler 1232 is used to broadcast all the wavelengths from the East Line interface 1202*a* to wavelength equalizer s WE2 1205*b*, WE5 1205*e*, and WE11 1205*k*. Lastly, optical coupler 1236 is used to broadcast all the wavelengths from the South Line interface 1203*a* to wavelength equalizers WE3 1205*c*, WE7 1205*g*, and WE9 1205*i*.

Optical coupler 1231 is used to combine the wavelengths from wavelength equalizers WE2 1205*b*, WE3 1205*c* and WE4 1205*d* into one composite WDM signal that is optically amplified with output optical amplifier 1241*a*. Similarly, optical coupler 1233 is used to combine the wavelengths from wavelength equalizers WE6 1205*f*, WE7 1205*g*, and WE8 1205*h* into one composite WDM signal that is optically amplified with output optical amplifier 1241*b*. Lastly, optical coupler 1237 is used to combine the wavelengths from wavelength equalizers WE10 1205*j*, WE11 1205*k*, and WE12

1205m into one composite WDM signal that is optically amplified with output optical amplifier 1241c.

Optional optical amplifier 1243 receives added wavelengths from the multiplexer/de-multiplexer circuit pack 1220 via common port 1270b, and optically amplifies the wavelengths before forwarding the amplified wavelengths to optical coupler 1235. Optical coupler 1235 is used to broadcast the added wavelengths to the West Line interface 1201b, the East Line interface 1202b, and the South Line Interface 1203b via WE4 1205d, WE8 1205h, and WE12 1205m respectively.

Located on the multiplexer/de-multiplexer circuit pack 1220 is a plurality (r) of add/drop ports 1260, 1261. Individual wavelengths are added to the multiplexer/de-multiplexer circuit pack and then multiplexed via multiplexer 1251 into a composite WDM signal that is then forwarded to the ROADM circuit pack 1210 via the common port 1270b of the ROADM circuit pack. In the drop direction on 1220, a composite WDM signal is received from the ROADM circuit pack 1210 via the common port 1270a and then it is de-multiplexed into individual wavelengths using de-multiplexer 1250. Each de-multiplexed wavelength is then forwarded to a specific drop port of the de-multiplexer. The multiplexer and de-multiplexer may be implemented using Arrayed Waveguide Grating (AWG) technology, or some other suitable technology. Devices that process individual wavelengths for transmission—such as optical transponders (not shown)—can be used to supply and receive wavelengths from the add/drop ports.

As can be seen in 1200, a single multiplexer/de-multiplexer circuit pack 1220 is used to add and drop wavelengths to/from the East, West, and South Line interfaces. Therefore, a transponder that is attached to an add/drop port of the multiplexer/de-multiplexer circuit pack 1220, can forward and receive wavelengths from any of the three degrees of the ROADM circuit pack. Because of this, the add/drop ports are referred to as directionless add/drop ports—meaning the add/drop ports are not dedicated to a particular direction of the optical node. The wavelength equalizers on the ROADM circuit pack are used to steer the added and dropped wavelengths to and from each degree by appropriately blocking or passing wavelengths. Therefore, the wavelength equalizers are said to perform directionless steering for the add/drop ports.

Additionally, the wavelength equalizers on the ROADM circuit pack are used to select which wavelengths from the Line input interfaces are allowed to exit a given output interface (degree), by appropriately blocking or passing wavelengths.

Figure 13:
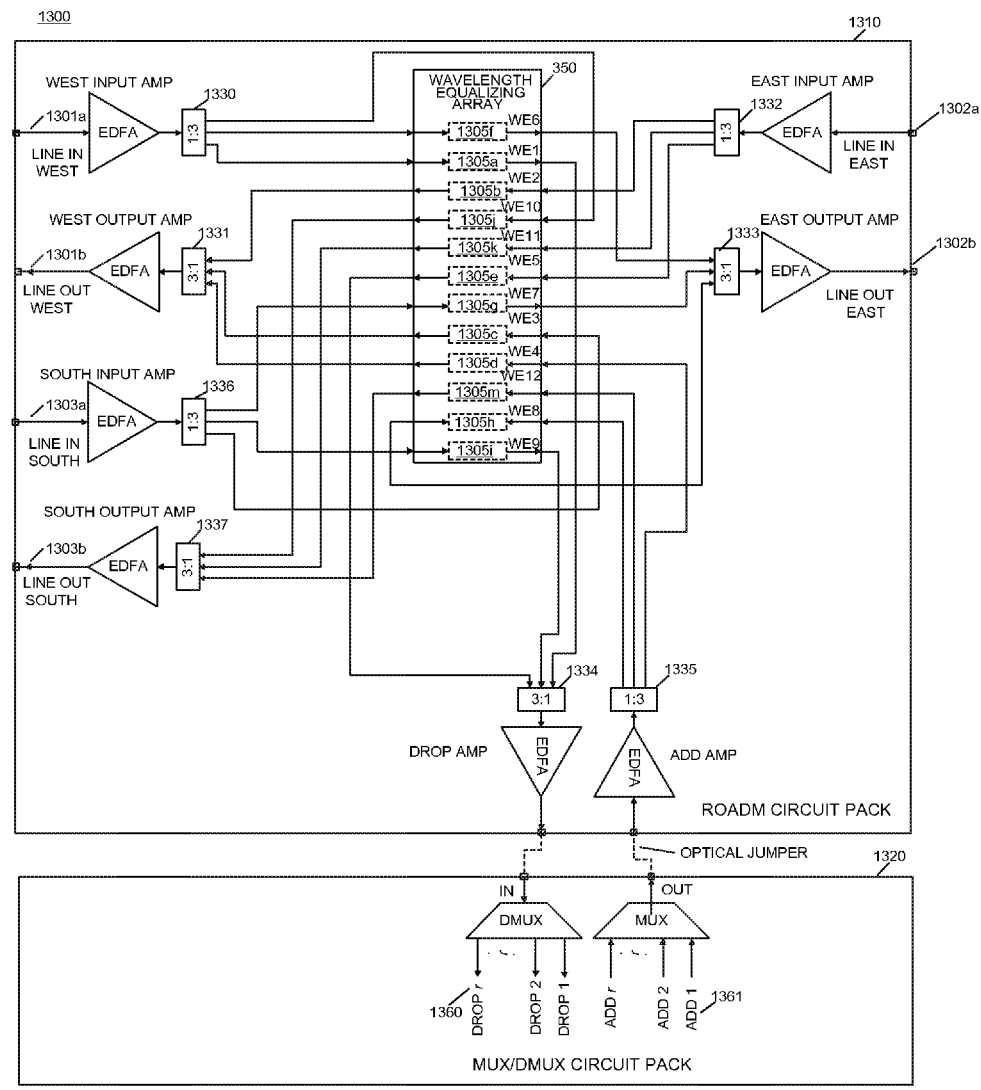
FIG. 13 is an illustration of an optical node comprising of a three degree ROADM on a circuit pack utilizing a wavelength equalizing array containing twelve wavelength equalizers, with an external multiplexer/de-multiplexer circuit pack.

FIG. 13 shows a three degree optical node 1300 that is identical to the optical node 1200, except that a single wavelength equalizing array 350 is used to supply all the required wavelength equalizers needed to construct the optical node. (Alternatively, multiple smaller wavelength equalizing arrays could be utilized.) The wavelength equalizers WE1-WE12 1305a-m in 1300 correspond to the wavelength equalizers WE1-WE12 1205a-m in 1200. The single wavelength equalizing array 350 may be identical to the wavelength equalizing array 350 discussed in reference to FIG. 3.

A single ROADM circuit pack 1310 supplies all the required optical circuitry to support three optical degrees, including input and output amplifiers for each degree, a common optical port connectable to a plurality of directionless add/drop ports, optical supervisory channel circuitry (not shown), optical channel monitoring (not shown), and a single wavelength equalizing array 350 that is used to both select wavelengths for each degree and to perform directionless steering for the add/drop ports of each degree.

As can be seen in 1300, a single multiplexer/de-multiplexer circuit pack 1320 is used to add and drop wavelengths to/from the East 1302a-b, West 1301a-b, and South 1303a-b Line interfaces. Therefore, a transponder that is attached to an add/drop port of the multiplexer/de-multiplexer circuit pack 1320, can forward and receive wavelengths to/from any of the three degrees of the ROADM circuit pack. Because of this, the add/drop ports are referred to as directionless add/drop ports—meaning the add drop ports are not dedicated to a particular direction of the optical node. The wavelength equalizers on the ROADM circuit pack are used to steer the added and dropped wavelengths to and from each degree by appropriately blocking or passing wavelengths. Therefore, the wavelength equalizers are said to perform directionless steering for the add/drop ports.

Additionally, the wavelength equalizers on the ROADM circuit pack 1310 are used to select which wavelengths from the Line input interfaces are allowed to exit a given output Line interface (degree), by appropriately blocking or passing wavelengths.

The ROADM circuit pack 1310 is constructed on one or more printed circuit boards that are bound together electrically and mechanically so that the circuit pack can be plugged into a backplane as a single entity. The ROADM circuit pack additionally contains a front panel (used to house the optical connectors associated with the optical ports on the ROADM), electrical control circuitry (used to take in user commands needed to control the ROADM), power supply circuitry (used to provide the various voltage levels and electrical currents needed to power the various components on the ROADM), and one or more backplane connectors (needed to connect electrical signals on the ROADM circuit pack to signals on the back plane that the ROADM card is plugged into).

Alternatively, the optical multiplexer/de-multiplexer circuitry on the multiplexer/de-multiplexer circuit pack 1320 could be placed on the ROADM circuit pack 1310, thus eliminating a circuit pack in the optical node.

The add/drop ports on the multiplexer/de-multiplexer circuit pack 1320 are considered to be colored add/drop ports. This is because each add/drop port is used to support a particular optical frequency (wavelength). So therefore, add/drop port 1 will only support wavelength frequency 1, and therefore a transponder attached to add/drop port 1 must only generate wavelength frequency 1. An alternative (not shown) is to supply an alternative multiplexer/de-multiplexer circuit pack that contains colorless add/drop ports. A colorless add/drop port can be used to support any of the r wavelength frequencies associated with the ROADM circuit pack, and therefore a transponder attached to add/drop port 1 is allowed to generate any of the r wavelength frequencies.

The wavelength equalizing array (350) saves physical space and electrical power by utilizing common optics and electronics for all the wavelength equalizers in the array, thus making it more suitable for compact edge-of-network applications. The single wavelength equalizing array also provides a means to simplify the construction of the ROADM circuit pack that it is placed upon. Furthermore, the wavelength equalizing array 350 provides the flexibility to generate alternative functions and architectures by simply changing the manner in which the wavelength equalizing array is connected to other optical components on the ROADM circuit pack.

In summary, optical node 1300 comprises of three degrees with corresponding optical interfaces 1301a-b, 1302a-b, and 1303a-b, a plurality of directionless add/drop ports 1361, 1360, and at least one wavelength equalizing array 350, wherein the at least one wavelength equalizing array 350 is used to both select wavelengths for each optical degree (via wavelength equalizers 1305b-d, 1305f-h, & 1305j-m), and to perform directionless steering for the plurality of directionless add/drop ports 1361,1360 (via wavelength equalizers 1305a, 1305d, 1305e, 1305h, 1305i, 1305m). The three degree optical node may be implemented with a single ROADM circuit pack comprising of all three degrees.

Figure 14:
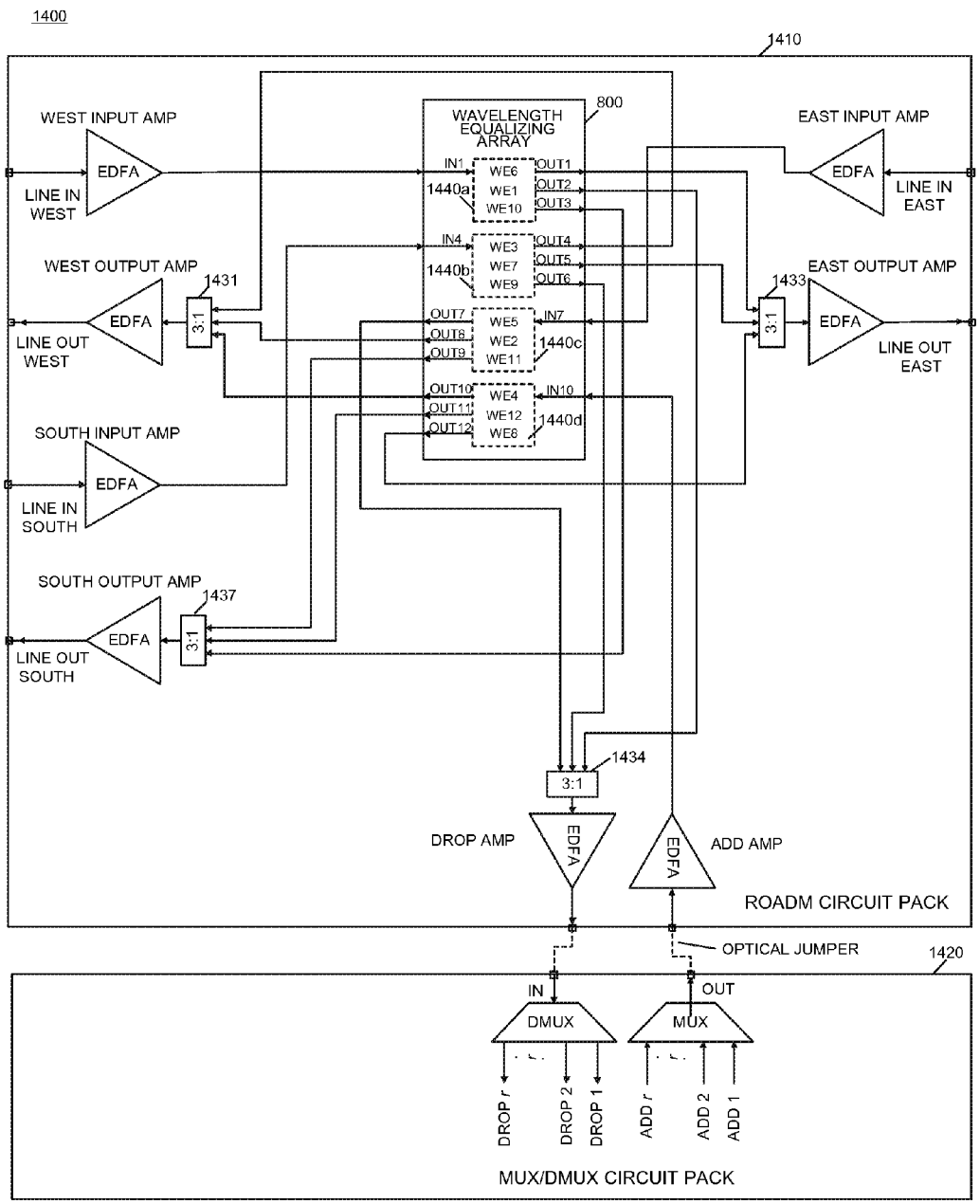
FIG. 14 is an illustration of an alternative embodiment of an optical node comprising of a three degree ROADM on a circuit pack utilizing a wavelength equalizing array containing twelve wavelength equalizers, with an external multiplexer/de-multiplexer circuit pack.

FIG. 14 shows a three degree optical node 1400 that is identical to the optical node 1200, except that a single wavelength equalizing array 800 is used to supply all the required wavelength equalizers needed to construct the optical node. The wavelength equalizing array that is used is the wavelength equalizing array 800 that was described in reference to FIG. 8. This wavelength equalizing array can be configured to perform the function of multiple 1 by 3 WSS devices. Therefore, the function of the optical couplers 1230, 1232, 1235, and 1236 of optical node 1200 are additionally absorbed within the wavelength equalizing array 800. The 3 by 1 WSS function 1440a performs the function of WE1 1205a, WE6 1205f, WE10 1205j, and optical coupler 1230 within optical node 1200, while the 3 by 1 WSS function 1440b performs the function of WE3 1205c, WE7 1205g, WE9 1205i, and optical coupler 1236 within optical node 1200, and the 3 by 1 WSS function 1440c performs the function of WE2 1205b, WE5 1205e, WE11 1205k, and optical coupler 1232 within optical node 1200, and the 3 by 1 WSS function 1440d performs the function of WE4 1205d, WE8 1205h, WE12 1205m, and optical coupler 1235 within optical node 1200. Couplers 1431, 1433, 1434, and 1437, correspond to the couplers 1231, 1233, 1234, and 1237 within ROADM circuit pack 1210. As can be seen from FIG. 14, using the wavelength equalizing array 800 in place of wavelength equalizing array 310 further simplifies the ROADM circuit pack due to the additional level of integration.

Figure 15:
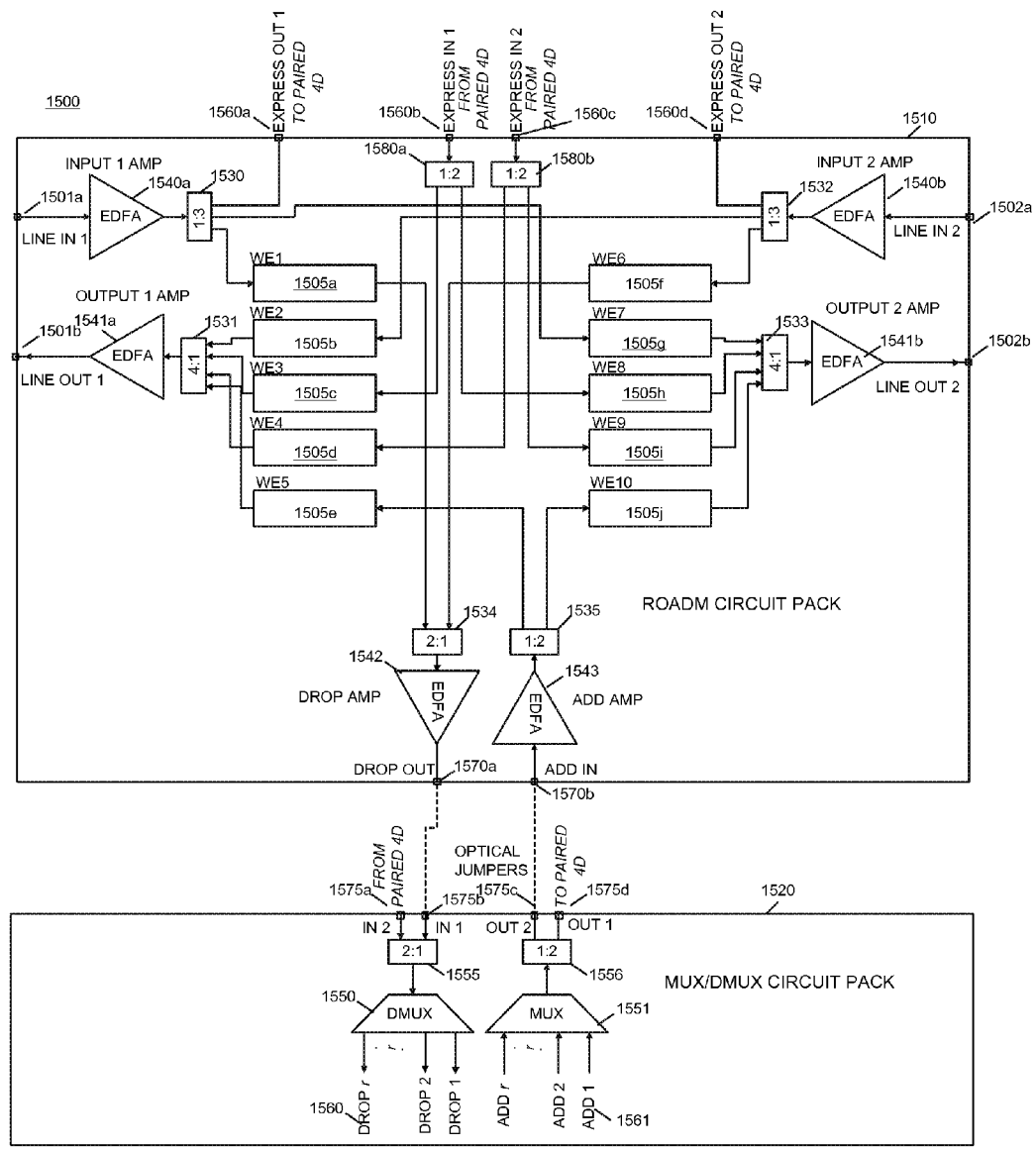
FIG. 15 is an illustration of a two degree optical node comprising of a two degree ROADM on a circuit pack that can be expanded to a four degree optical node.

FIG. 15 shows an optical node 1500 comprising of a two-degree Reconfigurable Optical Add/Drop Multiplexer (ROADM) 1510 on a circuit pack with an external multiplexer/de-multiplexer circuit pack 1520. The ROADM circuit pack can be used as a stand-alone ROADM in a two degree node, or it can be paired with a second identical ROADM circuit pack in order to form a four degree node. The four Express ports (Express Out 1&2 and Express In 1&2 1560a-d) are used to interconnect the two ROADMs when two ROADM circuit packs are paired to form a four degree node. Each line interface on the ROADM (Line In/Out 1 1501a-b and Line In/Out 2 1502a-b) represents an optical degree. Ten wavelength equalizers 1505a-j are used in the embodiment— five for each degree. Wavelength equalizer WE1 1505a is used to either pass or block wavelengths from the Line1 interface 1501a to the multiplexer/de-multiplexer circuit pack 1520. Similarly, wavelength equalizer WE6 1505f is used to either pass or block wavelengths from the Line 2 interface 1502a to the multiplexer/de-multiplexer circuit pack 1520. The wavelengths from WE1 1505a and WE6 1505f are combined together using optical coupler 1534, and then they are forwarded to the multiplexer/de-multiplexer circuit pack 1520 via optional optical amplifier 1542 through common optical port 1570a.

Wavelength equalizer WE5 1505e is used to either pass or block wavelengths from the multiplexer/de-multiplexer circuit pack 1520 to the Line 1 interface 1501b. It is also used to equalize the power levels of the wavelengths exiting out the Line 1 interface 1501b from the multiplexer/de-multiplexer circuit pack 1520. Similarly, wavelength equalizer WE10 1505j is used to either pass or block wavelengths from the multiplexer/de-multiplexer circuit pack 1520 to Line 2 interface 1502b. WE10 1505j is also used to equalize the power levels of the wavelengths exiting out the Line 2 interface 1502b from the multiplexer/de-multiplexer circuit pack 1520.

Wavelength equalizer WE2 1505b, WE3 1505c, and WE4 1505d are used to either pass or block wavelengths from the Express 1560b-c and Line 2 1502a interfaces to the Line 1 interface 1501b. They are also used to equalize the power levels of the wavelengths exiting out the Line 1 interface 1501b from the Express 1560b-c and Line 2 1502a interfaces. Similarly, wavelength equalizers WE7 1505g, WE8 1505h, and WE9 1505i are used to either pass or block wavelengths from the Line 1 1501a and Express 1560b-c interfaces to the Line 2 interface 1502b. They are also used to equalize the power levels of the wavelengths exiting out the Line 2 1502b interface from the Line 1 1501a and Express 1560b-c interfaces.

Optical couplers 1580a and 1580b are used to broadcast the Express In 1 1560b and Express In 2 1560c optical input signals to both the Line 1 1501b and Line 2 1502b interface directions.

Optional input optical amplifiers 1540a-b are used to optically amplify wavelengths arriving from the Line 1 1501a and 2 Line 2 1502a interfaces.

Optical coupler 1530 is used to broadcast all the wavelengths from the Line 1 interface 1501a to wavelength equalizers WE1 15050a and WE7 1505g, and the Express Out 1 port 1560a. Similarly, optical coupler 1532 is used to broadcast all the wavelengths from the Line 2 interface 1502a to wavelength equalizers WE2 1505b and WE6 1505f, and the Express Out 2 port 1560d.

Optical coupler 1531 is used to combine the wavelengths from wavelength equalizers WE2 1505b through WE5 1505e into one composite WDM signal that is optically amplified with output optical amplifier 1541a. Similarly, optical coupler 1533 is used to combine the wavelengths from wavelength equalizers WE7 1505g through WE10 1505j into one composite WDM signal that is optically amplified with output optical amplifier 1541b.

Optional optical amplifier 1543 receives added wavelengths from the multiplexer/de-multiplexer circuit pack 1520 via common port 1570b, and optically amplifies the wavelengths before forwarding the amplified wavelengths to optical coupler 1535. Optical coupler 1535 is used to broadcast the added wavelengths to the Line 1 interface 1501b, and the Line 2 interface 1502b via WE5 1505e and WE10 1505j respectively.

Located on the multiplexer/de-multiplexer circuit pack 1520 is a plurality (r) of add/drop ports 1561, 1560. Individual wavelengths are added to the multiplexer/de-multiplexer circuit pack and then multiplexed via multiplexer 1551 into a composite WDM signal that is then forwarded to the ROADM circuit pack 1510 via common port 1570b. In the drop direction on 1520, a composite WDM signal is received from common port 1570a of the ROADM circuit pack and then it is de-multiplexed into individual wavelengths using de-multiplexer 1550. Each de-multiplexed wavelength is then forwarded to a specific drop port of the de-multiplexer. The multiplexer and de-multiplexer may be implemented using Arrayed Waveguide Grating (AWG) technology, or some other suitable technology. Devices that process individual wavelengths for transmission—such as optical transponders—can be used to supply and receive wavelengths from the add/drop ports.

Figure 16A:
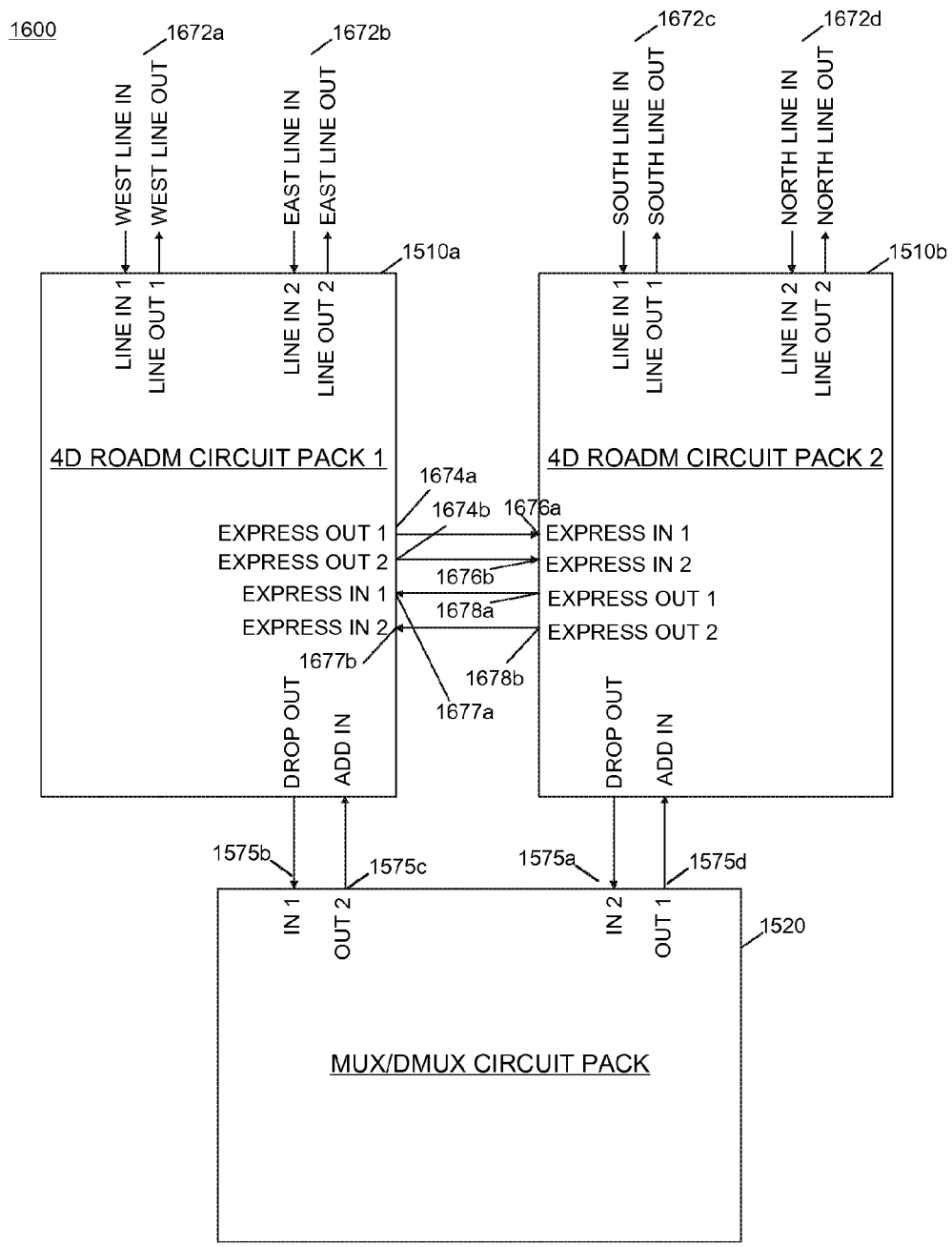
FIG. 16A is an illustration of a four degree optical node comprising of two 2-degree ROADM circuit packs, with a single external multiplexer/de-multiplexer circuit pack.

It should be noted that multiplexer/de-multiplexer circuit pack 1520 contains two WDM input ports (IN1 1575b and IN2 1575a), and two WDM output ports (OUT1 1575d and OUT2 1575c). This is to allow connection to up to two ROADM circuit packs 1510, as illustrated in FIG. 16A. An optical coupler 1555 is used combine composite WDM signals from two ROADM circuit packs 1510 before forwarding the composite WDM signal to de-multiplexer 1550. An optical coupler 1556 is used to broadcast the composite WDM signal from multiplexer 1551 to two ROADM circuit packs 1510.

As can be seen in 1500, a single multiplexer/de-multiplexer circuit pack 1520 is used to add and drop wavelengths to/from the Line 1 1501a and Line 2 1502a interfaces. Therefore, a transponder that is attached to an add/drop port of the multiplexer/de-multiplexer circuit pack 1520, can forward and receive wavelengths from either of the two degrees of the ROADM circuit pack. Because of this, the add/drop ports are referred to as directionless add/drop ports—meaning the add drop ports are not dedicated to a particular direction of the optical node. If two ROADM circuit packs 1510a-b are paired to form a four degree optical node (as shown in 1600 of FIG. 16A), wherein ROADM circuit packs 1510a-b are identical to ROADM circuit pack 1510), the optical couplers 1555 and 1556 allow a transponder that is attached to an add/drop port of the multiplexer/de-multiplexer circuit pack 1520 to forward and receive wavelengths from any of the four degrees of the combined two ROADM circuit packs 1510a and 1510b. The wavelength equalizers (1505a, 1505e, 1505f, and 1505j) on the two ROADM circuit packs are used to steer the added and dropped wavelengths to and from each degree by appropriately blocking or passing wavelengths. Therefore, the wavelength equalizers are said to perform directionless steering for the add/drop ports.

Additionally, the wavelength equalizers (1505b-e and 1505g-j) on the two ROADM circuit packs 1510a-b are used to select which wavelengths from the Line input interfaces and add ports are allowed to exit a given output interface (degree), by appropriately blocking or passing wavelengths.

FIG. 16A shows a four degree optical node 1600. It uses two of the ROADM circuit packs 1510a and 1510b, and a single multiplexer/de-multiplexer circuit pack 1520. The single multiplexer/de-multiplexer circuit pack 1520 contains two WDM input ports (IN1 1575b and IN2 1575a), and two WDM output ports (OUT1 1575d and OUT2 1575c), allowing both the ROADM circuit packs to share a common set of transponders (attached to the add/drop ports on the multiplexer/de-multiplexer circuit pack). The common set of transponders can connect to any of the four degrees (East 1672b, West 1672a, North 1672d, and South 1672c). ROADM circuit Pack 1 1510a sends all wavelengths it receives from its two line interfaces 1672a-b to ROADM circuit Pack 2 1510b via ROADM circuit Pack 1's two Express Out ports (1 & 2 1674a-b). Similarly, ROADM circuit Pack 2 1510b sends all wavelengths it receives from its two line interfaces 1672c-d to ROADM circuit Pack 1 1510a via ROADM circuit Pack 2's two Express Out ports (1 & 2 1678a-b). The result is that both ROADM Circuit Pack 1 1510a and Circuit Pack 2 1510b have access to all wavelengths received from all four degrees of the optical node.

In 1600, Express OUT 1 1674a, Express OUT2 1674b, Express IN 1 1677a, and Express IN 2 1677b, correspond to the same signals Express OUT 1 1560a, Express OUT2 1560d, Express IN 1 1560b, and Express IN 2 1560c in 1500 respectively. Similarly, in 1600, Express OUT 1 1678a, Express OUT2 1678b, Express IN 1 1676a, and Express IN 2 1676b, correspond to the same signals Express OUT 1 1560a, Express OUT2 1560d, Express IN 1 1560b, and Express IN 2 1560c in 1500 respectively.

Figure 16B:
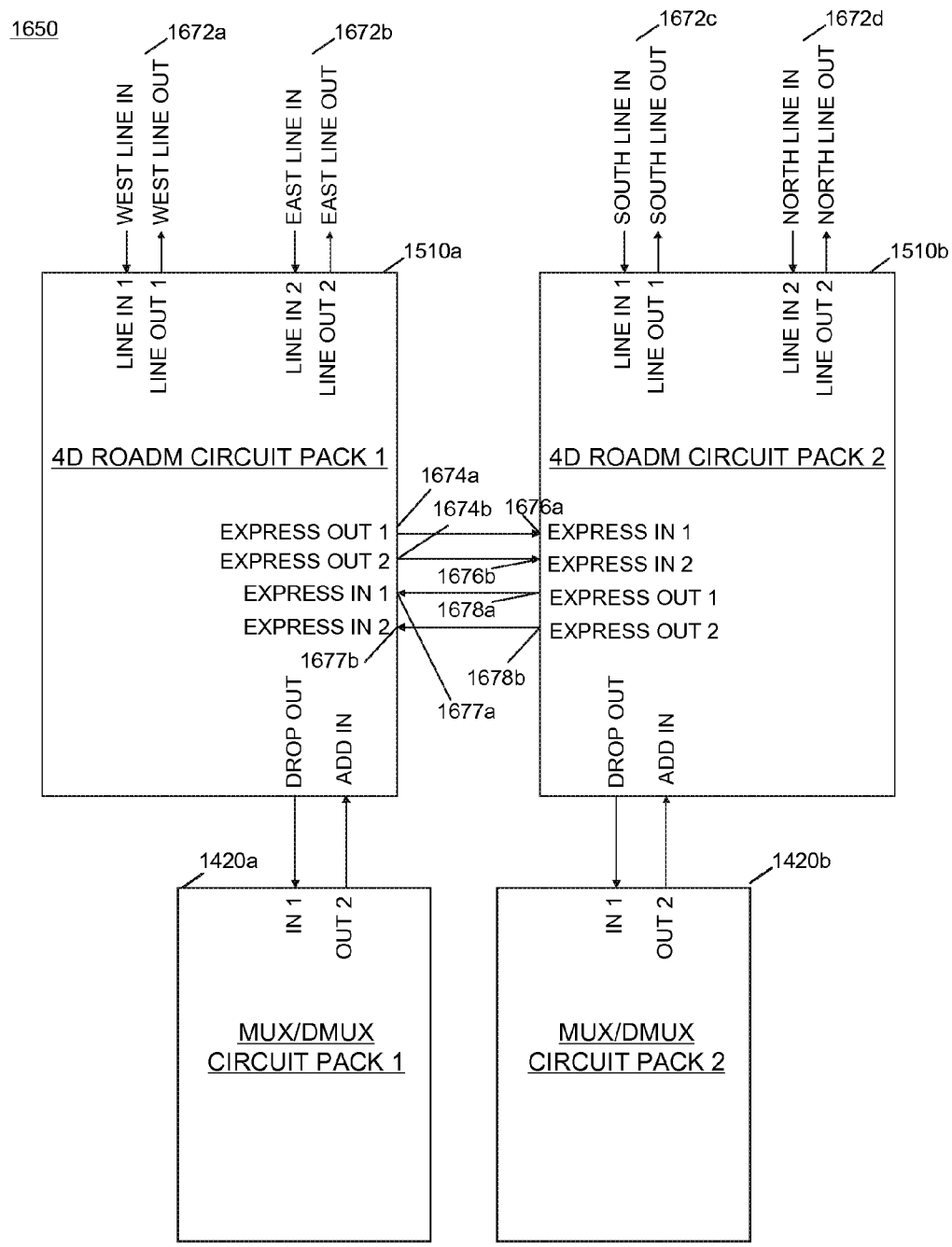
FIG. 16B is an illustration of a four degree optical node comprising of two 2-degree ROADM circuit packs, with two external multiplexer/de-multiplexer circuit packs.

FIG. 16B shows a four degree optical node 1650. It uses two of the ROADM circuit packs 1510a-b, and two multiplexer/de-multiplexer circuit packs 1420a-b. (Alternatively, it could also use multiplexer/de-multiplexer circuit packs 1520, and just use only one pair of IN/OUT ports.) Using two multiplexer/de-multiplexer circuit packs provides some added reliability. A drawback is that a given transponder attached to an add/drop port of one of the multiplexer/de-multiplexer circuit packs will only be able to communicate through the two optical degrees associated with the ROADM that the multiplexer/de-multiplexer circuit pack is attached to. So in this case, the add/drop ports are directionless, but a given transponder is only able to send and receive wavelengths from two of the four degrees.

The two multiplexer/de-multiplexer circuit packs 1520, 1420 may contain active components (i.e., components requiring electrical power in order to operate), or they may contain only passive components (athermal AWGs, for example). If the multiplexer/de-multiplexer circuit packs contains only passive components, then the multiplexer/de-multiplexer circuit packs could optionally be placed outside of the electrical shelf that is holding the ROADM circuit packs.

Figure 17:
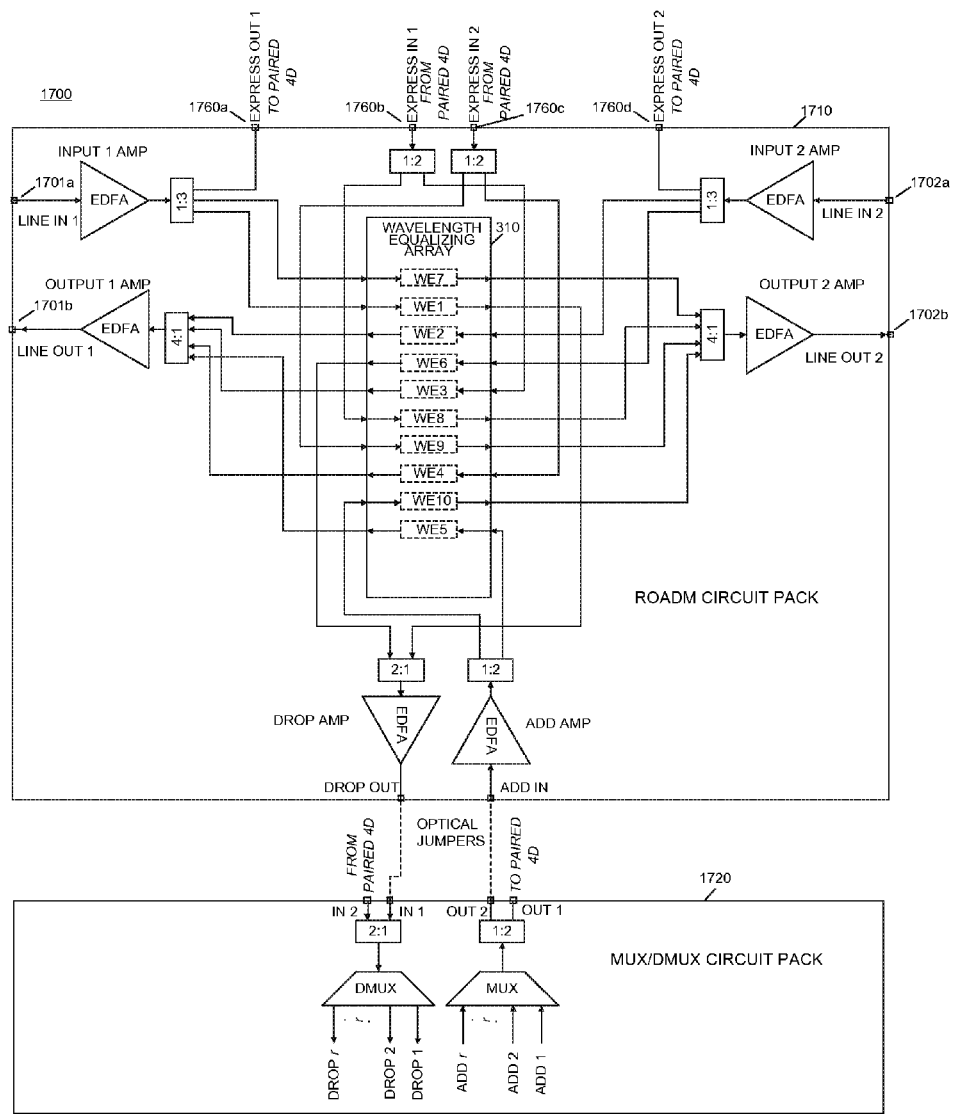
FIG. 17 is an illustration of a two degree optical node utilizing a wavelength equalizing array comprising of a two degree ROADM on a circuit pack that can be expanded to a four degree optical node, with an external multiplexer/de-multiplexer circuit pack.

FIG. 17 shows a two degree optical node 1700 that is identical to the optical node 1500, except that a single wavelength equalizing array is used to supply all the required wavelength equalizers needed to construct the optical node. (Alternatively, multiple smaller wavelength equalizing arrays could be utilized.) The wavelength equalizers WE1-WE10 in 1700 correspond to the wavelength equalizers WE1-WE10 in 1500. The single wavelength equalizing array 310 may be identical to the wavelength equalizing array 310 discussed in reference to FIG. 3.

A single ROADM circuit pack 1710 supplies all the required optical circuitry to support two optical degrees, including input and output amplifiers for each degree, an optical common port connectable to a plurality of directionless add/drop ports, optical supervisory channel circuitry (not shown), optical channel monitoring (not shown), and a single wavelength equalizing array 310 that is used to both select wavelengths for each degree and to perform directionless steering for the add/drop ports.

The ROADM circuit pack can be used as a stand-alone ROADM in a two degree node, or it can be paired with a second identical ROADM circuit pack in order to form a four degree node. The four Express ports (Express Out 1&2 1760a,d and Express In 1&2 1760b,c) are used to interconnect the two ROADMs in the same manner as shown in FIG. 16A.

As can be seen in 1700, a single multiplexer/de-multiplexer circuit pack 1720 is used to add and drop wavelengths to/from the Line 1 1701a-b and Line 2 1702a-b interfaces. Therefore, a transponder that is attached to an add/drop port of the multiplexer/de-multiplexer circuit pack 1720, can forward and receive wavelengths from either of the two degrees of the ROADM circuit pack. If a second ROADM circuit pack is added to the optical node, a transponder that is attached to an add/drop port of the multiplexer/de-multiplexer circuit pack 1720, can forward and receive wavelengths from any of the four degrees of the resulting optical node. The wavelength equalizers on the ROADM circuit pack are used to steer the added and dropped wavelengths to and from each degree by appropriately blocking or passing wavelengths. Therefore, the wavelength equalizers are said to perform directionless steering for the add/drop ports for each degree.

Additionally, the wavelength equalizers on the ROADM circuit pack 1710 are used to select which wavelengths from the Line input interfaces are allowed to exit a given output Line interface (degree), by appropriately blocking or passing wavelengths.

The ROADM circuit pack is constructed on one or more printed circuit boards that are bound together electrically and mechanically so that the circuit pack can be plugged into a backplane as a single entity. The ROADM circuit pack additionally contains a front panel (used to house the optical connectors associated with the optical ports on the ROADM), electrical control circuitry (used to take in user commands needed to control the ROADM), power supply circuitry (used to provide the various voltage levels and electrical currents needed to power the various components on the ROADM), and one or more backplane connectors (needed to connect electrical signals on the ROADM to signals on the back plane that the ROADM card is plugged into).

Alternatively, the optical multiplexer/de-multiplexer circuitry on the multiplexer/de-multiplexer circuit pack 1720 could be placed on the ROADM circuit pack 1710, thus eliminating a circuit pack in the optical node.

The add/drop ports on the multiplexer/de-multiplexer circuit pack 1720 are considered to be colored add/drop ports. This is because each add/drop port is used to support a particular optical frequency (wavelength). So therefore, add/drop port 1 will only support wavelength frequency 1, and therefore a transponder attached to add/drop port 1 must only generate wavelength frequency 1. An alternative (not shown) is to supply an alternative multiplexer/de-multiplexer circuit pack that contains colorless add/drop ports. A colorless add/drop port can be used to support any of the r wavelength frequencies associated with the ROADM circuit pack, and therefore a transponder attached to add/drop port 1 is allowed to generate any of the r wavelength frequencies.

The wavelength equalizing array saves physical space and electrical power by utilizing common optics and electronics for all the wavelength equalizers in the array, thus making it more suitable for compact edge-of-network applications. The single wavelength equalizing array also provides a means to simplify the construction of the ROADM circuit pack that it is placed upon.

In summary, this invention presents an embodiment of an optical node 1600 comprising of four optical degrees, and further comprising of a plurality of directionless add/drop ports 1561, 1560, and including a first circuit pack 1510a and a second circuit pack 1510b, wherein each circuit pack interfaces to at least two of the four optical degrees 1672a-d. The node additionally contains at least one wavelength equalizing array 310. The optical node 1600 may further include a third circuit pack 1520/1720, containing the plurality of directionless add/drop ports 1561, 1560, and wherein the first and second circuit packs 1510a-b direct wavelengths to and from the third circuit pack. The first and second circuit packs may be ROADM circuit packs, each comprising of a single wavelength equalizing array and a common port connectable to a plurality of directionless add/drop ports, wherein each ROADM circuit pack interfaces to at least two of the four optical degrees, and wherein each wavelength equalizing array is used to both select wavelengths for the optical degrees and to perform directionless steering for the plurality of directionless add/drop ports.

Figure 18:
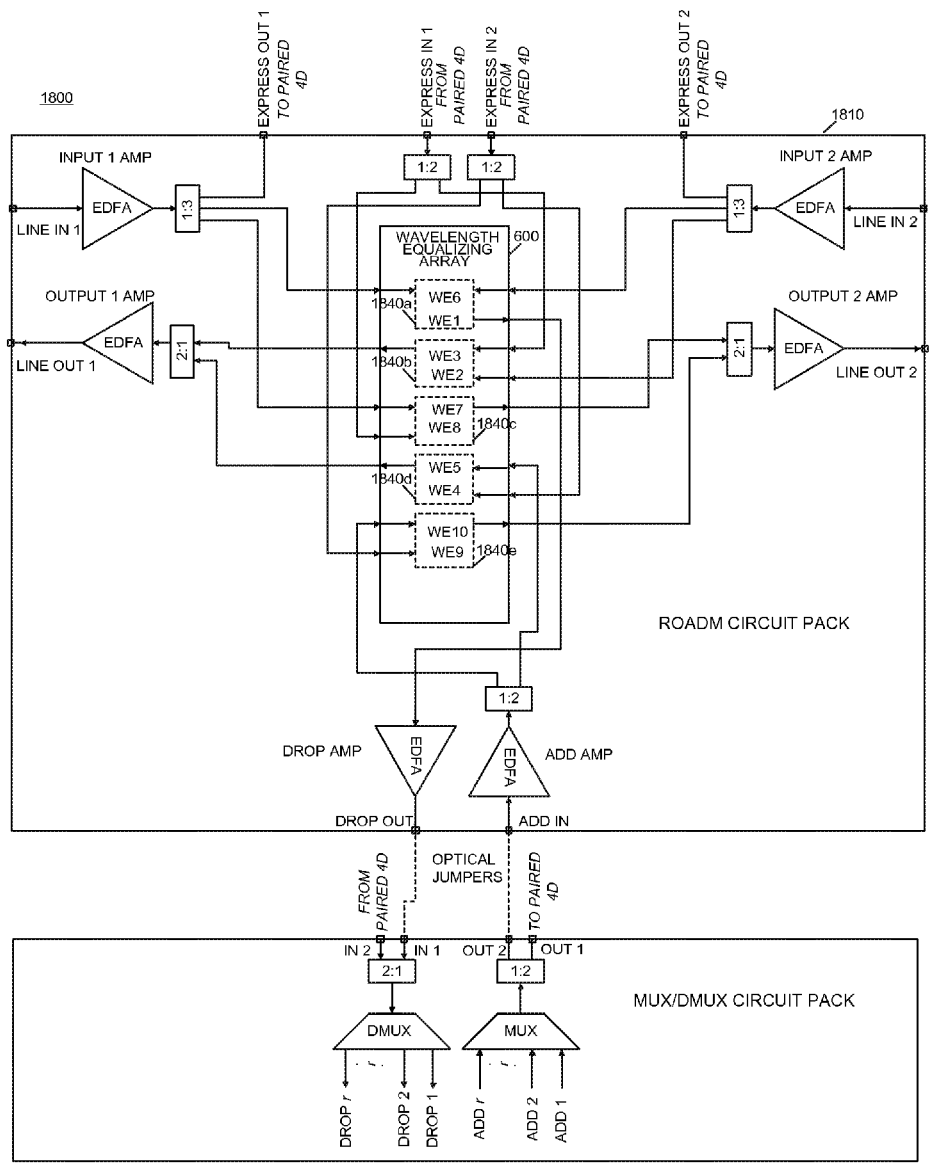
FIG. 18 is an illustration of an alternative embodiment of an optical node comprising of a two degree ROADM on a circuit pack that can be expanded to a four degree optical node, with an external multiplexer/de-multiplexer circuit pack.

FIG. 18 shows a two degree optical node 1800 that is identical to the optical node 1500, except that a single wavelength equalizing array 600 is used to supply all the required wavelength equalizers needed to construct the optical node. The wavelength equalizing array that is used is the wavelength equalizing array that was described in reference to FIG. 6. This wavelength equalizing array can be configured to perform the function of multiple 1 by 2 WSS devices. Therefore, the function of the optical coupler 1534 of optical node 1500 is additionally absorbed within the wavelength equalizing array 600. Also, the functions of optical couplers 1531 and 1533 are partially absorbed within the array 600 in 1800. The 2 by 1 WSS function 1840a performs the function of WE1 1505a, WE6 1505f, and optical coupler 1534 within optical node 1500, while the 2 by 1 WSS function 1840b performs the function of WE2 1505b, WE3 1505c, and partially optical coupler 1531 within optical node 1500, and the 2 by 1 WSS function 1840c performs the function of WE7 1505g, WE8 1505h, and partially optical coupler 1533 within optical node 1500, and the 2 by 1 WSS function 1840d performs the function of WE4 1505d, WE5 1505e, and partially optical coupler 1531 within optical node 1500, and the 2 by 1 WSS function 1840e performs the function of WE9 1505i, WE10 1505j, and partially optical coupler 1533 within optical node 1500. As can be seen from the figure, using the wavelength equalizing array 600 in place of wavelength equalizing array 310 further simplifies the ROADM circuit pack due to its additional level of integration.

Although a wavelength equalizing array of 2 by 1 WSS devices was utilized to build ROADM circuit pack 1800, a wavelength equalizing array that can be configured for either 4 by 1 WSS devices or 2 by 1 WSS devices could be used instead, in order to eliminate additional circuitry. For instance, a first 4 by 1 WSS could absorb WE2 1505b, WE3 1505c, WE4 1505d, WE5 1505e, and coupler 1531 on the ROADM circuit pack 1500. Similarly, a second 4 by 1 WSS could absorb WE7 1505g, WE8 1505h, WE9 1505i, WE10 1505j, and coupler 1533 on the ROADM circuit pack 1500. A 2 by 1 WSS could absorb WE1 1505a, WE6 1505f, and coupler 1534 on the ROADM circuit pack 1500. Therefore, different ROADM circuit packs can be constructed such that they are built using a single wavelength equalizing array wherein different size WSS functions are utilized within the array.

In general, an optical node or ROADM circuit pack could be constructed using a wavelength equalizing array that can be partitioned into an array of $k_1$ 1×1, $k_2$ 1×2, $k_3$ 1×3 ..., $k_p$ 1×p wavelength selective switches, where p is any integer number greater than 1, and $k_j$ is any integer value greater than or equal to 0. A single type of wavelength equalizing array could be used to build different types of ROADM circuit packs. For instance, wavelength equalizing array 350 (FIG. 3) could be used to build a two-degree ROADM circuit pack 1010, a three-degree ROADM circuit pack 1310, or a four-degree capable ROADM circuit pack 1710. Similarly, wavelength equalizing array 800 (FIG. 8) could be used to build a two-degree ROADM circuit pack 1110, a three-degree ROADM circuit pack 1410, or a four-degree capable ROADM circuit pack 1810.

Although in 1800 two ROADM circuit packs are required to construct a four degree optical node, all four degrees can be placed on a single ROADM circuit pack. In order to build the four degree ROADM using a single ROADM circuit pack, a wavelength equalizing array of 20 wavelength equalizers would be required—five for each of the four degrees. Alternatively, two wavelength equalizers with 10 wavelength equalizers each could be used.

Additionally, optical nodes containing greater than four degrees could be constructed by extending the concepts used to construct the three and four degree nodes.

Figure 19:
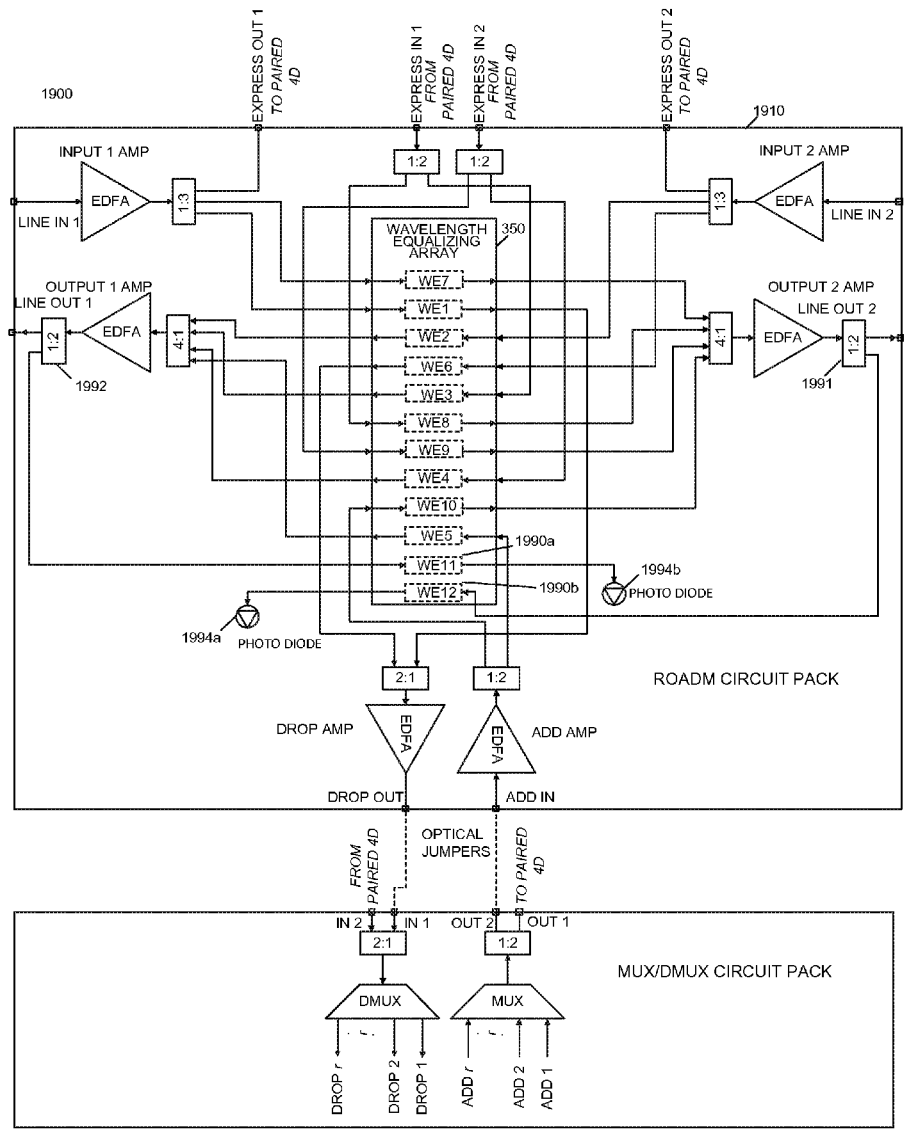
FIG. 19 is an illustration of an optical node comprising of a two degree ROADM on a circuit pack that contains two optical channel monitors utilizing photo diodes.

FIG. 19 shows a two degree optical node 1900 that is identical to the optical node 1700, except that two additional wavelength equalizing arrays 1990a-b are used to support optical channel monitor functions. As shown in FIG. 19, an additional 1 to 2 coupler 1991 & 1992 has been added after the output of each of the two output amplifiers within ROADM circuit pack 1910. The couplers are used to send a portion of the light from each output amplifier to the wavelength equalizers 1990*a-b*. Operationally, each of the two newly added wavelength equalizers 1990*a-b* are used to cycle through all r wavelengths exiting the two line interfaces in order to measure the optical power of each wavelength using photo diodes 1994*a-b*.

Figure 20:
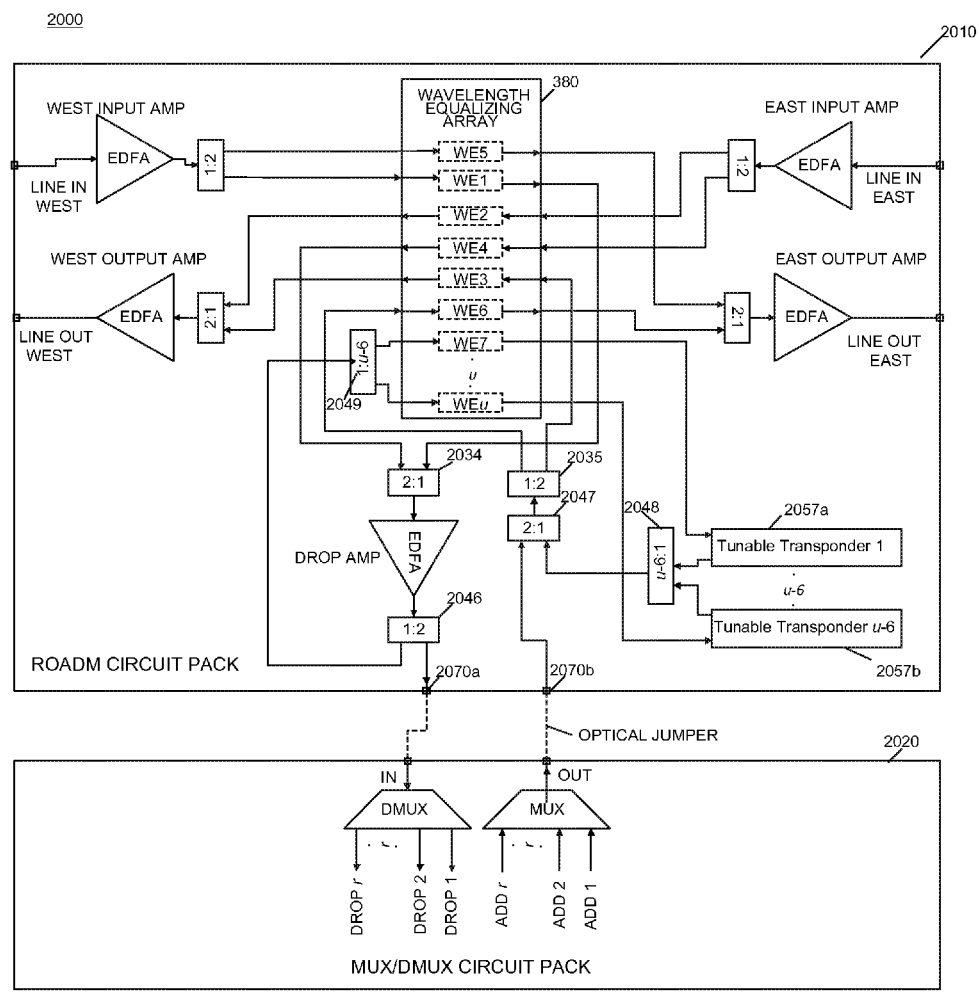
FIG. 20 is an illustration of an optical node comprising of a two degree ROADM on a circuit pack with internal transponders, and an external multiplexer/de-multiplexer circuit pack.

FIG. 20 shows a two degree optical node 2000 that is similar to the optical node 1000, except that u−6 internal transponders 2057*a-b* are integrated in the ROADM circuit pack 2010 (wherein u may be any integer value greater than six). A wavelength equalizing array 380 with u wavelength equalizers is used. Each additional wavelength equalizer beyond six is used to filter out a single wavelength that is then dropped to an integrated transponder. Four optical couplers 2046-2049 are added to the node of 1000. Coupler 2048 is a (u−6):1 coupler used to combine the output wavelengths from the u−6 internal transponders. Coupler 2047 is used to combine the wavelengths from the internal transponders with the wavelengths from the multiplexer (via common port 2070*b*) within the multiplexer/de-multiplexer circuit pack 2020. An optical amplifier (not shown) could optionally be placed at the output of optical coupler 2047. Optical coupler 2035 is then used to broadcast the wavelengths from the internal transponders and from the multiplexer/de-multiplexer circuit pack to both degrees—allowing the wavelengths from the internal transponders to be directionless.

In the drop direction, new coupler 2046 is used to broadcast all the dropped wavelengths received from both degrees to both the multiplexer/de-multiplexer circuit pack (via common port 2070*a*) and to coupler 2049. Coupler 2049 is a 1:(u−6) coupler used to broadcast all the dropped wavelengths received from both degrees to the u−6 wavelength equalizers that are used to filter wavelengths for the u−6 internal transponders.

A ROADM circuit pack with integrated transponders 2010 allows for especially compact optical nodes, as no external transponders are required for cases where a small numbers of wavelengths are added and dropped.

Figure 21:
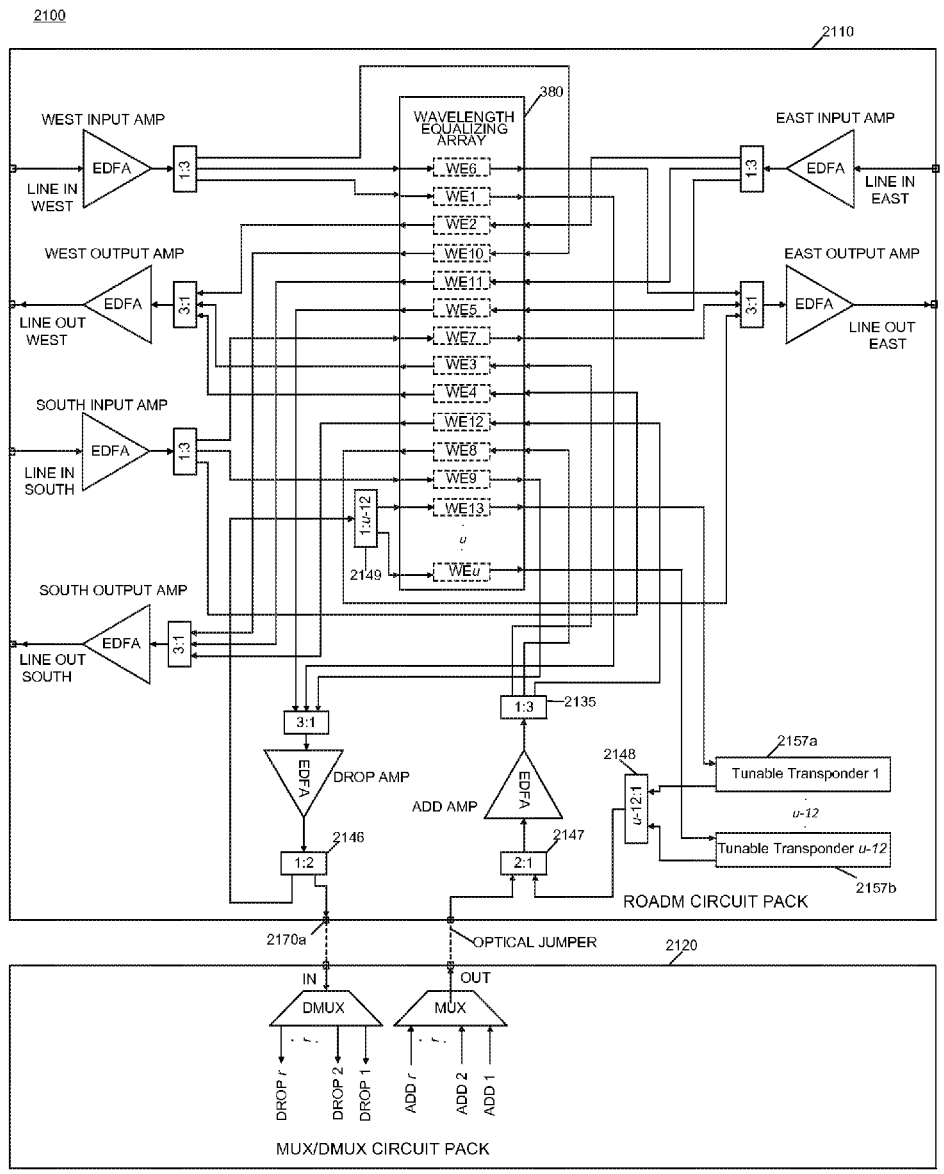
FIG. 21 is an illustration of an optical node comprising of a three degree ROADM on a circuit pack with internal transponders, and an external multiplexer/de-multiplexer circuit pack.

FIG. 21 shows a three degree optical node 2100 that is similar to the optical node 1300, except that u−12 internal transponders are integrated in the ROADM circuit pack 2110 (wherein u may be any integer value greater than twelve). A wavelength equalizing array 380 with u wavelength equalizers is used. Each additional wavelength equalizer beyond twelve is used to filter out a single wavelength that is then dropped to an integrated transponder. Four optical couplers 2146-2149 are added to the node of 1300. Coupler 2148 is a (u−12):1 coupler used to combine the output wavelengths from the u−12 internal transponders 2157*a-b*. Coupler 2147 is used to combine the wavelengths from the internal transponders with the wavelengths from the multiplexer within the multiplexer/de-multiplexer circuit pack 2120. An optical amplifier is optionally placed at the output of optical coupler 2147. Optical coupler 2135 is then used to broadcast the wavelengths from the internal transponders and from the multiplexer/de-multiplexer circuit pack to all three degrees—allowing the wavelengths from the internal transponders to be directionless.

In the drop direction, new coupler 2146 is used to broadcast all the dropped wavelengths received from all three degrees to both the multiplexer/de-multiplexer circuit pack 2120 (via common port 2170*a*) and to coupler 2149. Coupler 2149 is a 1:(u−12) coupler used to broadcast all the dropped wavelengths received from all three degrees to the u−12 wavelength equalizers that are used to filter wavelengths for the u−12 internal transponders.

Figure 22:
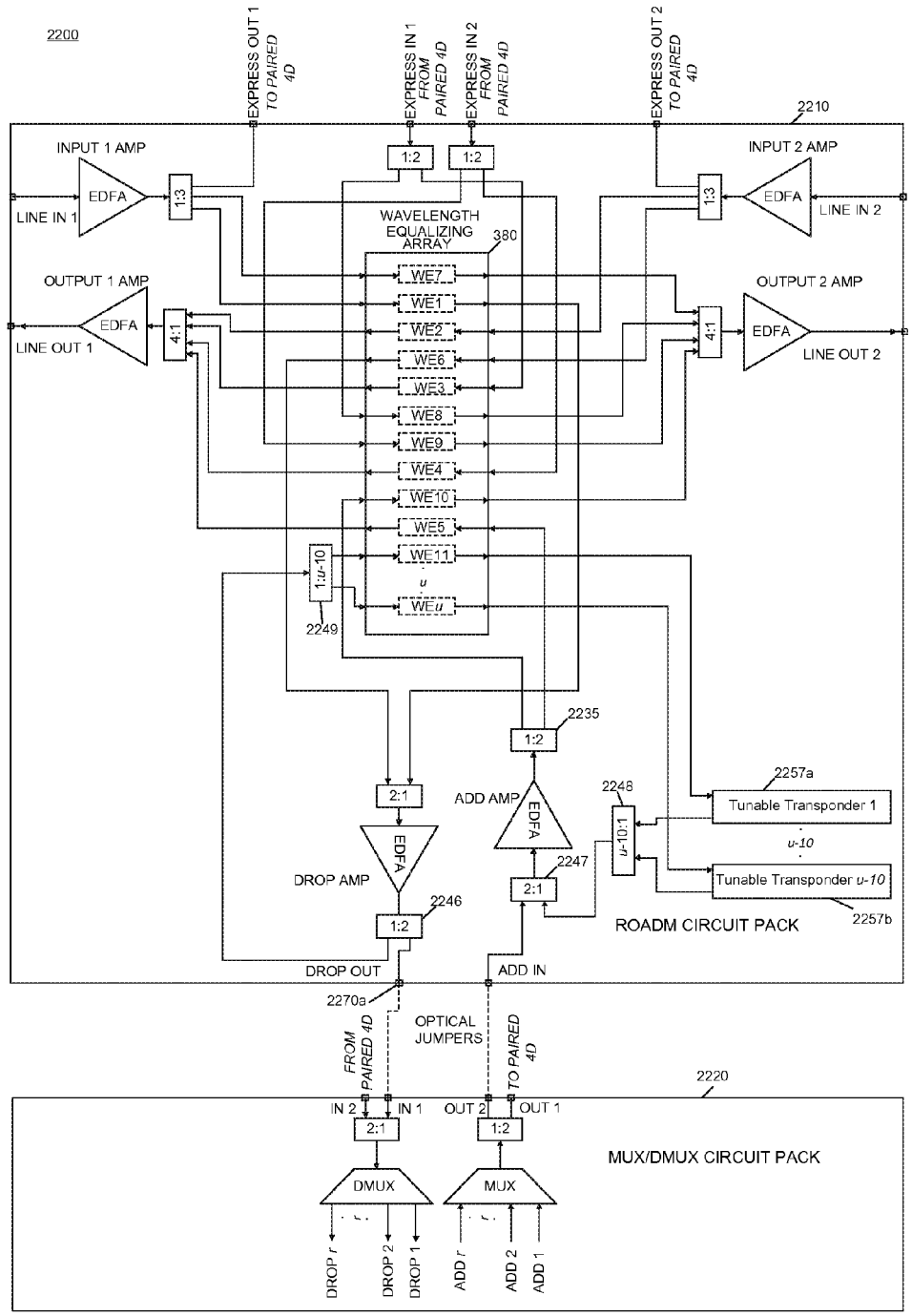
FIG. 22 is an illustration of a first embodiment of an optical node comprising of an expandable two degree ROADM on a circuit pack with internal transponders, and an external multiplexer/de-multiplexer circuit pack.

FIG. 22 shows an expandable (to four degrees) two degree optical node 2200 that is similar to the optical node 1700, except that u−10 internal transponders are integrated in the ROADM circuit pack 2210 (wherein u may be any integer value greater than ten). A wavelength equalizing array 380 with u wavelength equalizers is used. Each additional wavelength equalizer beyond ten is used to filter out a single wavelength that is then dropped to an integrated transponder. Four optical couplers 2246-2249 are added to the node of 1700. Coupler 2248 is a (u−10):1 coupler used to combine the output wavelengths from the u−10 internal transponders. Coupler 2247 is used to combine the wavelengths from the internal transponders with the wavelengths from the multiplexer within the multiplexer/de-multiplexer circuit pack 2220. An optical amplifier is optionally placed at the output of optical coupler 2247. Optical coupler 2235 is then used to broadcast the wavelengths from the internal transponders and from the multiplexer/de-multiplexer circuit pack to both degrees on the circuit pack—allowing the wavelengths from the internal transponders to be directionless with respect to the two degrees on the circuit pack.

In the drop direction, new coupler 2246 is used to broadcast all the dropped wavelengths received from both degrees on the circuit pack to both the multiplexer/de-multiplexer circuit pack (via common port 2270*a*) and to coupler 2249. Coupler 2249 is a 1:(u−10) coupler used to broadcast all the dropped wavelengths received from both degrees to the u−10 wavelength equalizers that are used to filter wavelengths for the u−10 internal transponders.

Figure 23:
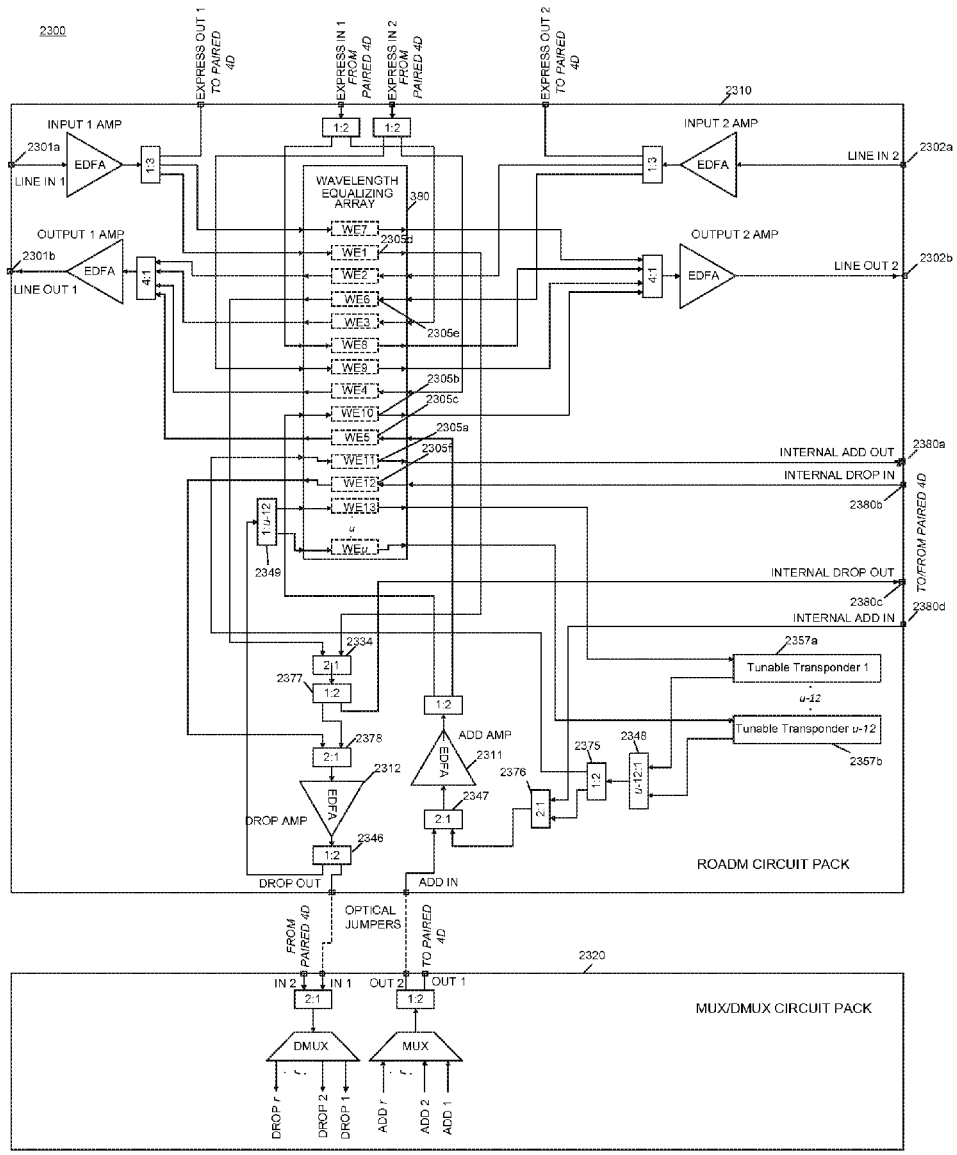
FIG. 23 is an illustration of a second embodiment of an optical node comprising of an expandable two degree ROADM on a circuit pack with internal transponders, and an external multiplexer/de-multiplexer circuit pack.

A drawback of the optical node 2200 is that the u−10 internal transponders can only send to and receive from the two degrees of the circuit pack that they reside on. Optical node 2300 in FIG. 23 overcomes this limitation. The u−12 internal transponders 2357*a-b* within ROADM circuit pack 2310 can send and receive to and from any of the four degrees when two ROADM circuit packs 2310 are paired together to form a four degree node. This is accomplished by using an additional four-fiber interconnection between the two paired ROADM circuit packs. In FIG. 23 the four additional signals that are passed between the two ROADM circuit packs are labeled: Internal Add Out 2380*a*, Internal Add In 2380*d*, Internal Drop Out 2380*c*, and Internal Drop In 2380*b*. Four optical couplers are added to the ROADM circuit pack 2210: 2375-2378. Coupler 2375 is used to broadcast the composite signal from coupler 2348 containing the generated wavelengths from all u−12 internal transponders to both optical coupler 2376 and Wavelength Equalizer WE11 (2305*a*). Wavelength Equalizer WE11 (2305*a*) is used to block or pass any of the internally generated wavelengths to the paired ROADM circuit pack (the second ROADM circuit pack). This is a useful feature if an internally generated wavelength of a particular frequency is already being injected on the paired ROADM circuit pack. The output of WE11 (2305*a*) is sent to the optical connector labeled Internal Add Out 2380*a* on the first ROADM circuit pack. Internal Add Out 2380*a* on the first ROADM circuit pack is connected to Internal Add In on the second ROADM circuit pack via an optical jumper, and vice versa. The wavelengths arriving on the optical connector labeled Internal Add In on the second ROADM circuit pack are forwarded to the optical coupler 2376 on the second ROADM circuit pack, where they are combined with the internal generated wavelengths of the second circuit pack. Therefore, the signal exiting coupler 2376 contains the internally generated wavelengths of the second ROADM circuit pack, and any internally generated wavelengths from the first ROADM circuit pack that will be forwarded to at least one of the two degrees of the second ROADM circuit pack. All of these wavelengths are then combined with the wavelengths from the multiplexer/de-multiplexer circuit pack 2320 using optical coupler 2347. The resulting signals are optionally amplified by the ADD Amp 2211, and then broadcasted to both WE10 (2305b) and WE5 (2305c). WE10 (2305b) is used to pass or block wavelengths to Line Out 2 (2302b), while WE5 (2305c) is used to pass or block wavelengths to Line Out 1 (2301b). Therefore, it can be seen that internally generated wavelengths from the first ROADM circuit pack can be forwarded to both degrees of the paired second ROADM circuit pack.

In the drop direction, wavelengths to be dropped from the Line In 1 (2301a) and Line In 2 (2302a) interfaces on the first ROADM circuit pack are selected via WE1 (2305d) and WE6 (2305e). These two sets of wavelengths to be dropped are combined using coupler 2334. The composite WDM signal from 2334 is broadcasted to optical coupler 2378 and the optical connector labeled Internal Drop Out 2380c using optical coupler 2377. All of the dropped signals from the first ROADM circuit pack are sent to the second ROADM circuit pack via the optical connector labeled Internal Drop Out 2380c on the first ROADM circuit pack. The optical connector labeled Internal Drop Out 2380c on the first ROADM circuit pack is connected to the optical connector labeled Internal Drop In on the second ROADM circuit pack using an optical jumper. Therefore, all the dropped wavelengths from the first ROADM circuit pack are made available to the second ROADM circuit pack via the connector labeled Internal Drop In on the second ROADM circuit pack. The wavelengths arriving on the connector labeled Internal Drop In on the second ROADM circuit pack are forwarded to Wavelength Equalizer WE12 (2305f) on the second circuit pack. WE12 (2305f) can be used to block any wavelengths that are not being dropped on the second ROADM circuit pack. Typically, WE12 (2305f) should block all wavelengths other than the wavelengths destined for internal transponders on the second ROADM circuit pack. The wavelengths that are not blocked by WE12 (2305f) are combined with the wavelengths being dropped from the Line 1 (2301a) and Line 2 (2302a) interfaces on the second ROADM circuit pack using coupler 2378 on the second ROADM circuit pack. The combined signals are optionally amplified by the Drop Amp 2312 on the second ROADM circuit pack, and then broadcasted to both the multiplexer/de-multiplexer circuit pack 2320 and optical coupler 2349 via coupler 2346. Coupler 2349 broadcasts its inputted signal to the entire group of the u−12 Wavelength Equalizers used to filter out individual drop wavelengths for the internal transponders on the second ROADM circuit pack. In this manner, wavelengths dropped from any of the four degrees in a four degree node can be forwarded to any internal transponder on either of the two paired ROADM circuit packs (assuming all wavelength blocking is accounted for). The two wavelength equalizers WE11 (2305a) and WE12 (2305f) can be used to isolate the add/drop signals associated with the paired ROADM circuit packs.

Figure 24:
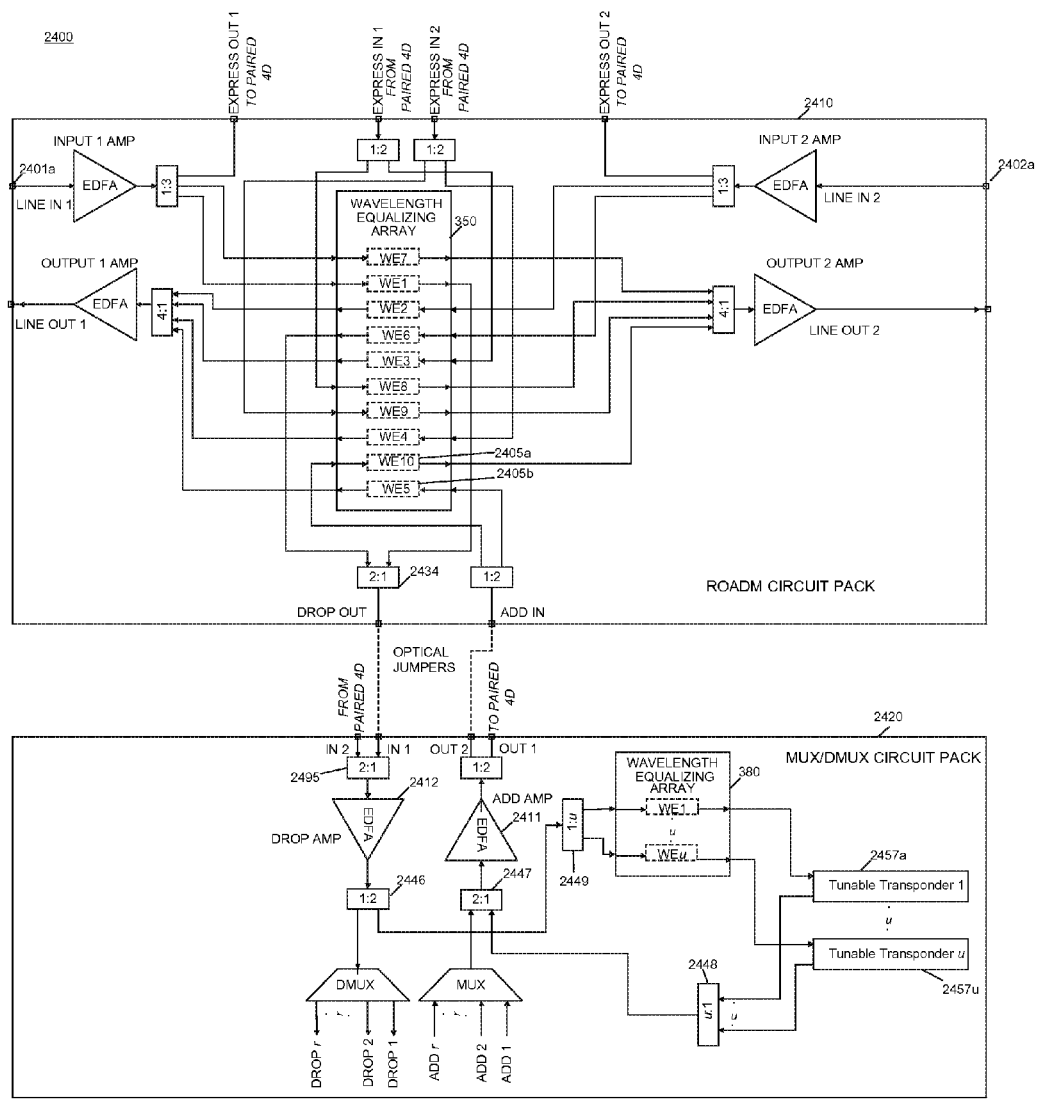
FIG. 24 is an illustration of a third embodiment of an optical node comprising of an expandable two degree ROADM on a circuit pack, and an external multiplexer/de-multiplexer circuit pack with internal transponders.

The optical node 2400 with wavelength equalizing array 350 shown in FIG. 24 is an alternative to optical node 2300. In the optical node 2400, the internal transponders can send and receive wavelengths from any of the four degrees when a four degree node is created using two of the ROADM circuit packs 2410, but instead of the internal transponders being located within the ROADM circuit packs they are instead located within the multiplexer/de-multiplex circuit pack 2420. This greatly simplifies the design, but a separate wavelength equalizing array 380 is now required in the node for the multiplexer/de-multiplex circuit pack. In the add direction, the output from u number of transponders are combined using optical coupler 2448. The composite WDM signal from coupler 2448 is then combined with the composite WDM signal from the multiplexer (MUX) via coupler 2447. The resulting signal is optionally amplified by the Add Amp 2411, and then broadcasted to both ROADM circuit packs (only one shown) attached to the multiplexer/de-multiplex circuit pack 2420. In this manner, any signal generated by the transponders internal to the multiplexer/de-multiplex circuit pack 2420 are able to be inserted into either of the two degrees on the two ROADM circuit packs (via WE5 (2405b) and WE10 (2405a)).

In the drop direction, wavelengths being dropped from both Line In 1 (2401a) and Line In 2 (2402a) on a given ROADM circuit pack are combined using coupler 2434, and then forwarded to the multiplexer/de-multiplex circuit pack 2420. Coupler 2495 is then used to combine dropped signals from both ROADM circuit packs into one composite WDM signal that is amplified by the Drop Amp 2412 and then broadcasted to both the DMUX and optical coupler 2449 via coupler 2446. Coupler 2449 is used to broadcast all of the dropped channels from both ROADM circuit packs to all of the u wavelength equalizers within the wavelength equalizing array 380. Each of the u wavelength equalizers is used to select a single wavelength for its corresponding internal transponder 2457a-u. Therefore, in this manner, each of the u internal transponders has access to all of the dropped wavelengths associated with all four degrees.

Although only a single common optical port is shown on the ROADM circuit packs of the optical nodes 1000, 1300, 1700, 1900, 2000, 2100, 2200, 2300, 2400, and 2500, the invention is not limited to a single common port on a given ROADM circuit pack, and in fact, a given ROADM circuit pack may contain any number of common ports C. Each common port requires two wavelength equalizers per degree, with one of the two wavelength equalizers being used in the drop direction, and with one of the two wavelength equalizers being used in the add direction—each wavelength equalizer being used in the same manner as was shown for the ROADM circuit packs containing only a single common port.

Figure 25:
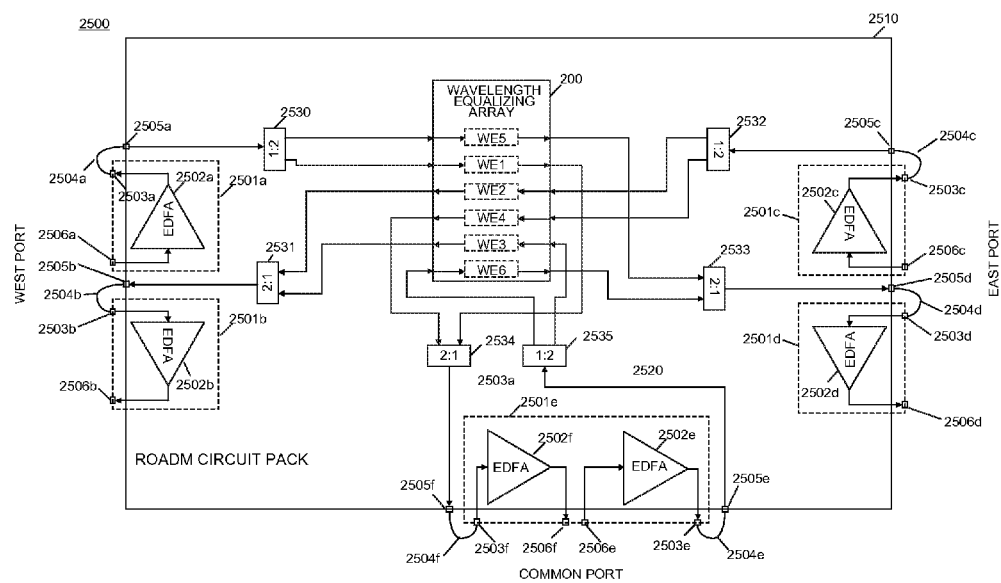
FIG. 25 is an illustration of a ROADM circuit pack comprising of a wavelength equalizing array and front panel pluggable amplifiers.
Figure 26:
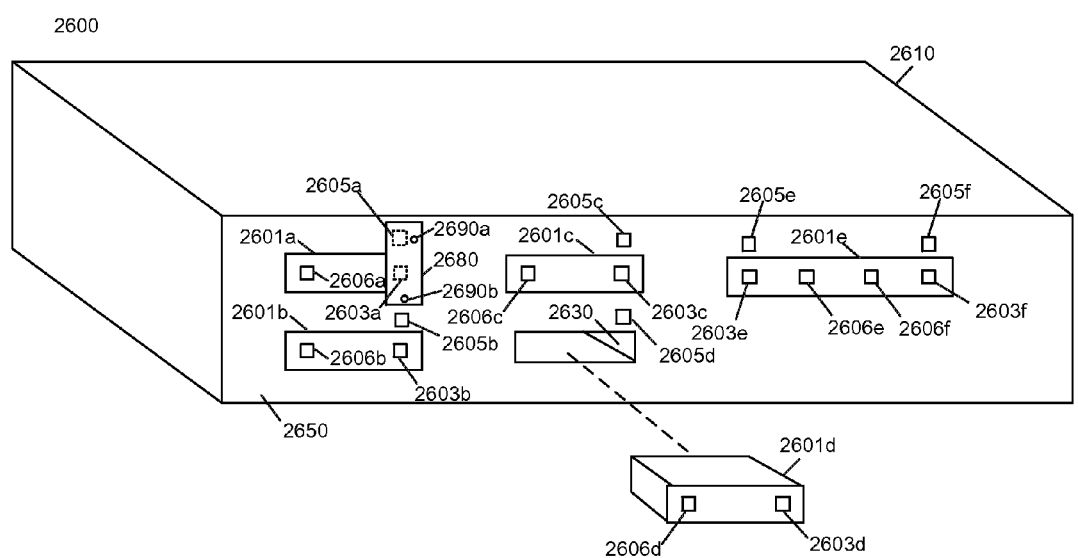
FIG. 26 is an alternative illustration of a ROADM circuit pack comprising of a wavelength equalizing array and front panel pluggable amplifiers.

In order to provide additional flexibility and reliability, the optical amplifiers within an optical node may be pluggable into the front panel of a ROADM circuit pack, as illustrated in FIG. 25 and FIG. 26. FIG. 25 2500 shows a ROADM circuit pack 2510 with wavelength equalizing array 200 with five front panel pluggable amplifiers 2501a-e. There are four pluggable amplifiers 2501a-d containing a single EDFA 2502a-d, and one pluggable amplifier containing two EDFAs 2501e. Each pluggable amplifier may contain the amplifying EDFA and other electrical and optical components (not shown). Each pluggable amplifier may further comprise of an electrical connector (not shown), used to apply electrical power to the amplifier, as well as control signals to control the amplifier and retrieve status information from the amplifier. Each pluggable amplifier may additionally comprise of an optical connector 2506a-f used to attach an external optical transmission fiber, and an optical connector 2503a-f used to optically jumper 2504a-f the associated amplifier to other optical circuitry 2530-2535 within the ROADM circuit pack via optical connector 2505a-f. Optionally, the optical jumper 2504a-f could be replaced by a blind-mate optical connector on the pluggable amplifier.

FIG. 26 (2600) shows a three-dimensional view of the ROADM circuit pack 2610 that can accommodate the five pluggable amplifiers 2501a-e shown in 2500. FIG. 26 shows three pluggable amplifiers 2601a-c (each comprising of a single EDFA) plugged into the front panel 2650 of the ROADM circuit pack 2610. FIG. 26 also shows a pluggable amplifier 2601e (comprising of a two EDFAs) plugged into the front panel 2650 of the ROADM circuit pack 2610. Additionally, FIG. 26 shows a fifth pluggable amplifier 2601d external to the ROADM circuit pack. Pluggable amplifier 2601d may be plugged into slot 2630 on the front panel 2650 of the ROADM circuit pack 2610. Each of the pluggable circuit packs 2601a-d containing a single EDFA also comprises of an optical connector 2606a-d to attach an external optical transmission fiber, and an optical connector 2603a-d used to optically jumper the associated amplifier to other optical circuitry within the ROADM circuit pack via optical connectors 2605a-d contained on the front panel 2650 of the ROADM circuit pack 2610. The pluggable circuit pack 2601e containing a two EDFAs also comprises of optical connectors 2606e-f to attach external optical transmission fibers, and an optical connector 2603e-f used to optically jumper the associated amplifier to other optical circuitry within the ROADM circuit pack via optical connectors 2605e-f contained on the front panel 2650 of the ROADM circuit pack 2610. The optical jumper used to connect the pluggable amplifier to the other optical circuitry within the ROADM circuit pack may comprise of a substantially flat planer lightwave circuit with optical connectors 2680, or it may comprise of some alternative optical connection technology (such as a simple short optical cable). The jumper 2680 could be further fastened to the front panel 2650 using some mechanical means such as mechanical screws 2690a-b.

Figure 27:
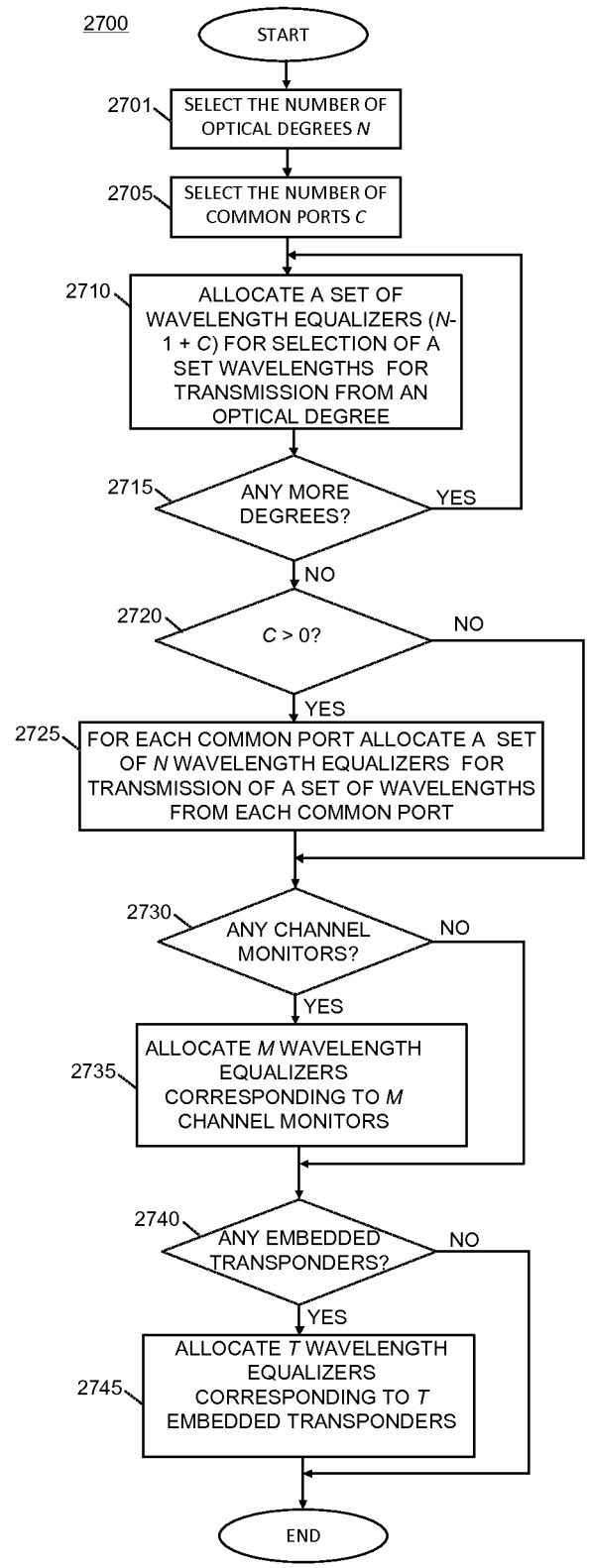
FIG. 27 is a flow diagram corresponding to a method of constructing a multi-degree optical node utilizing a wavelength equalizing array.

FIG. 27 illustrates a process 2700 of constructing a multi-degree optical node utilizing a wavelength equalizing array. At block 2701, the number of degrees N for the optical node is selected. At block 2705, the number of ports C common to all degrees is selected. At Step 2710, a set of N−1+C wavelength equalizers is allocated for the purpose of transmission of wavelengths from the first optical degree. At block 2715, a decision is made: if there are additional optical degrees, the process returns to block 2710, where an additional set of N−1+C wavelength equalizers is allocated for each additional degree. Once all N degrees have a set of N−1+C wavelength equalizers allocated to them, the process proceeds to block 2720. At this point, the total number of wavelength equalizers allocated is: N×(N−1+C). At block 2720, it is determined if there is at least one common optical port within the multi-degree optical node. If there are no common ports, the process proceeds to block 2730. If there is at least one common port, then the process proceeds to block 2725. At block 2725, for each common port, a set of N wavelength equalizers is allocated for transmission of a set of wavelengths from each common port. The number of wavelength equalizers allocated at this block is: C×N. Once the wavelength equalizers have been allocated for the common ports, the process proceeds to block 2730. At block 2730, it is determined if there are any optical channel monitors. If there are no optical channel monitors, then the process proceeds to block 2740. If there is at least one optical channel monitor, then at block 2735, M number of wavelength equalizers are allocated for M number of optical channel monitors. It should be noted that two or more optical degrees may share a single optical channel monitor by switching the optical channel monitor between the two or more optical degrees. Once the M wavelength equalizers have been allocated, the process proceeds to block 2740. At block 2740, it is determined if there are any embedded transponders. If there are no embedded optical transponders, then the process ends. If there is at least one embedded transponder, then at block 2745, T number of wavelength equalizers are allocated for T number of embedded transponders. Once, the T number of wavelength equalizers have been allocated at block 2745 the process ends. When the process 2700 ends, the total number of wavelength equalizers allocated to the optical node is: N×(N−1+C)+(C×N)+M+T, which is equal to $N^2+N(2C-1)+M+T$. For the special case where C=1, the total number of wavelength equalizers allocated is equal to: $N^2+N+M+T$.

Based upon the process presented in 2700, it is seen that the invention provides for a method of constructing a multi-degree optical node utilizing a wavelength equalizing array, comprising of allocating a first set of wavelength equalizers 2710 for selection of a first set of wavelengths for transmission from a first optical degree, and allocating at least a second set of wavelength equalizers 2710 for selection of at least a second set of wavelengths for transmission from at least a second optical degree, wherein the number of optical degrees N comprising the node is used to determine the number of wavelength equalizers assigned to each set. The method further includes allocating an additional set of wavelength equalizers 2725 for selection of an additional set of wavelengths for transmission from a common port connectable to a plurality of directionless add/drop ports. The method further includes allocating at least one wavelength equalizer 2735 for selection of wavelengths for an optical channel monitor. The method also further includes allocating at least one wavelength equalizer 2745 for selection of a wavelength for at least one transponder.

In the foregoing description, the invention is described with reference to specific example embodiments thereof. It will, however, be evident that various modifications and changes may be made thereto without departing from the broader spirit and scope of the present invention. The specification and drawings are accordingly to be regarded in an illustrative rather than restrictive sense.

What is claimed is:

1. A ROADM circuit pack, comprising:
    at least two optical degrees;
    a common port connectable to a plurality of directionless add/drop ports, wherein wavelengths from the common port may be directed to any of the at least two optical degrees; and
    at least one wavelength equalizing array, used to select wavelengths for each degree, and to perform directionless steering of wavelengths to and from the plurality of directionless add/drop ports, wherein the at least one wavelength equalizing array is partitioned into an array of $k_1$ 1×1, $k_2$ 1×2, $k_3$ 1×3 . . . , $k_p$ 1×p wavelength selective switches, where p is any integer number greater than 1, and $k_j$ is any integer value greater than or equal to 0.

2. A ROADM circuit pack, comprising:
    at least two optical degrees;
    a common port connectable to a plurality of directionless add/drop ports, wherein wavelengths from the common port may be directed to any of the at least two optical degrees;
    an optical channel monitoring function; and
    at least one wavelength equalizing array, used to select wavelengths for each degree, and to perform directionless steering of wavelengths to and from the plurality of directionless add/drop ports, and to provide wavelength filtering for the optical channel monitoring function.

3. A method of constructing a multi-degree optical node utilizing a wavelength equalizing array, comprising:
    allocating at least one wavelength equalizer for selection of wavelengths for an optical channel monitor;
    allocating a first set of wavelength equalizers for selection of a first set of wavelengths for transmission from a first optical degree; and allocating at least a second set of wavelength equalizers for selection of at least a second set of wavelengths for transmission from at least a second optical degree;

wherein the number of optical degrees comprising the node is used to determine the number of wavelength equalizers assigned to each set.

* * * * *